United States Patent
Rieser et al.

(10) Patent No.: US 7,289,972 B2
(45) Date of Patent: Oct. 30, 2007

(54) COGNITIVE RADIO ENGINE BASED ON GENETIC ALGORITHMS IN A NETWORK

(75) Inventors: Christian J. Rieser, Middletown, MD (US); Thomas W. Rondeau, Blacksburg, VA (US); Charles Bostian, Blacksburg, VA (US); Walling R. Cyre, Blacksburg, VA (US); Timothy M. Gallagher, Christiansburg, VA (US)

(73) Assignee: Virginia Tech Intellectual Properties, Inc., Blackburg, VA (US)

( * ) Notice: Subject to any disclaimer, the term of this patent is extended or adjusted under 35 U.S.C. 154(b) by 268 days.

(21) Appl. No.: 10/875,619

(22) Filed: Jun. 25, 2004

(65) Prior Publication Data

US 2006/0009209 A1    Jan. 12, 2006

(51) Int. Cl.
  *G06F 15/18* (2006.01)
  *G06N 3/00* (2006.01)
  *G06N 3/12* (2006.01)
(52) U.S. Cl. .............................. 706/13; 706/12; 706/14
(58) Field of Classification Search .................. 706/13, 706/12, 14; 709/223; 703/2
See application file for complete search history.

(56) References Cited

U.S. PATENT DOCUMENTS

2004/0236547 A1*  11/2004  Rappaport et al. .............. 703/2
2005/0027840 A1*   2/2005  Theobold et al. ........... 709/223
2005/0156775 A1*   7/2005  Petre et al. .................. 341/155

OTHER PUBLICATIONS

Special Report: ECEs and Biomedicine, Radio based on human learning developed for emergency situations, Apr. 2004, Virginia Tech, Internet, 1-4.*
ECE 2004 Annual Report, Apr. 2004, Virginia Tech, 22-23.*
Christian Rieser, Biologically Inspired Cognitive Wireless L12 Functionality, Apr. 11, 2003, Virginia Tech, 22.*
Christian James Rieser, Biologically Inspired Cognitive Radio Engine Model Utilizing Distributed Genetic Algorithms for Secure and Robust Wireless Communications and Network, Aug. 2004, Virginia Tech, Dissertation, 168.*

(Continued)

*Primary Examiner*—Joseph P Hirl
(74) *Attorney, Agent, or Firm*—Whitham Curtis Christofferson & Cook, P.C.

(57) ABSTRACT

A genetic algorithm (GA) approach is used to adapt a wireless radio to a changing environment. A cognitive radio engine implements three algorithms; a wireless channel genetic algorithm (WCGA), a cognitive system monitor (CSM) and a wireless system genetic algorithm (WSGA). A chaotic search with controllable boundaries allows the cognitive radio engine to seek out and discover unique solutions efficiently. By being able to control the search space by limiting the number of generations, crossover rates, mutation rates, fitness evaluations, etc., the cognitive system can ensure legal and regulatory compliance as well as efficient searches. The versatility of the cognitive process can be applied to any adaptive radio. The cognitive system defines the radio chromosome, where each gene represents a radio parameter such as transmit power, frequency, modulation, etc. The adaptation process of the WSGA is performed on the chromosomes to develop new values for each gene, which is then used to adapt the radio settings.

17 Claims, 31 Drawing Sheets

OTHER PUBLICATIONS

Charles W. Bostian, Rapidly Deployable Broadband Communications for Disaster Response, Mar. 2003, Virginia Tech, 39.*

Rondeau et al.; "Online Modeling of Wireless Channels with Hidden Markov Models and Channel Impulse Responses for Cognitive Radios"; 2004 International Microwave Symposium, Fort Worth, TX, Jun. 6-11, 2004.

Bostian et al; "Rapidly Deployable Broadband Communications for Disaster Response"; Sixthe International Symposium on Advanced Radio Technologies (SAFECOM Session); proceedings pp. 87-92, Boulder, CO; Mar. 2-4, 2004.

Bostian et al: "Cognitive Radio—A View from Virginia Tech"; 2003 Software Defined Radio Forum, Orlando, FL; Nov. 17-19, 2003.

* cited by examiner

|  | | 32 |
|---|---|---|
| version | header length | Type of service | Total length |
| Identification number | | Flags | Fragmentation offset |
| Time to live | Protocol | Header checksum |
| Source IP Address |
| Destination IP Address |
| (Options) | (Padding) |
| Source Port (defined in local system) | Destination Port = CSM_TCP_PORT |
| Sequence number |
| Acknowledgement number |
| Flags | Window |
| Checksum | Urgent pointer |
| (options) | (padding) |
| TCP PAYLOAD |

*Figure 28*

| 0 | | 32 |
|---|---|---|
| Total length of packet [in bytes] (16 bits) | | Number of Symbols (32 bits) |
| Number of Symbols (32 bits) | | Number of Bits (32 bits) |
| Number of Bits (32 bits) | | Number of Symbol Errors (32 bits) |
| Number of Symbol Errors (32 bits) | | Number of Bit Errors (32 bits) |
| Number of Bit Errors (32 bits) | | Symbol Error Rate (64 bits) |
| Symbol Error Rate (64 bits) | | |
| Symbol Error Rate (64 bits) | | Bit Error Rate (64 bits) |
| Bit Error Rate (64 bits) | | |
| Bit Error Rate (64 bits) | | Max Number of Burst Errors (32 bits) |
| Max Number of Burst Errors (32 bits) | | Histogram |
| Histogram (length is 8 bytes per bin for 'Max Number of Burst Errors' bins) | | |

*Figure 30*

| | |
|---|---|
| Total length of packet (bytes) | Number of chromosomes |
| Template chromosome (64 bytes) | |
| Function index 1 (16 bits) | Function index 2 (16 bits) |
| ... | ... |
| Function index n-1 (16 bits) | Function index n (16 bits) |
| Weight 1 | Weight 2 | Weight 3 | Weight 4 |
| Initial Chromosome 1 (64 bytes) |
| Initial Chromosome 2 (64 bytes) |
| ... |
| Initial Chromosome m (64 bytes) |

*Figure 32*

| Length of Packet | |
|---|---|
| 0 | System Chromosome (64 bits) |
| | BER (1/2) (64 bits) |
| | BER (2/2) (64 bits) |
| | PER (1/2) (64 bits) |
| | PER (2/2) (64 bits) |
| | Data Rate (1/2) (64 bits) |
| | Data Rate (2/2) (64 bits) |
| | SNiR (1/2) (64 bits) |
| | SNiR (2/2) (64 bits) |
| | Noise (1/2) (64 bits) |
| | Noise (2/2) (64 bits) |
| | Interference (1/2) (64 bits) |
| | Interference (2/2) (64 bits) |
| | Latency (1/2) (64 bits) |
| 32 | Latency (2/2) (64 bits) |

*Figure 34*

COGNITIVE RADIO ENGINE BASED ON GENETIC ALGORITHMS IN A NETWORK

GOVERNMENT LICENSE RIGHTS

The U.S. Government has a paid-up license in this invention and the right in limited circumstances to require the patent owner to license others on reasonable terms as provided for by the terms of NSF Grant Numbers EIA9983463 and DGE-9987586.

BACKGROUND OF THE INVENTION

1. Field of the Invention

The present invention generally relates to radio systems providing wireless voice and data links in networks, and more particularly, to a cognitive radio engine architecture which is capable of working under changing and unanticipated circumstances and in the presence of hostile jammers and interferers. The cognitive radio engine is capable of continuously adapting to its environment to conserve resources, such as radio frequency spectrum and battery power, in those applications where those resources are at a premium.

2. Background Description

Most traditional radios have their technical characteristics set at the time of manufacture. More recently, radios have been built that self adapt to one of several preprogrammed radio frequency (RF) environments that might be encountered. Cognitive radios go beyond preprogrammed settings to operate both in known and unknown wireless channels.

A cognitive radio can sense its environment and alter its technical characteristics and operational behavior to benefit both itself and its geographical and spectral neighbors. The ability to sense and respond intelligently distinguishes cognitive radios from fixed or adaptive radios. The characteristics of fixed radios are set at the time of manufacture. An adaptive radio can responds to channel conditions that represent one of a limited set of anticipated events. Adaptive radios use artificial intelligence (AI) algorithms that are basically a series of "IF, THEN, ELSE" algorithms. The radio may fail to take any useful action if it meets conditions that its designers never anticipated.

In contrast, a cognitive radio can respond intelligently to an unanticipated event; i.e., a wireless environment (channel) that it never encountered before. The result is enhanced performance (throughput, quality of service (QOS), and security) for the cognitive radio's network and reduced interference to other networks. The *Oxford English Dictionary* (OED) defines "cognitive" as "pertaining to cognition, or to the action or process of knowing", and "cognition" is defined as "the action or faculty of knowing taken in its widest sense, including sensation, perception, conception, etc., as distinguished from feeling and volition". Given these definitions, the process of sensing an existing wireless channel, evolving a radio's operation to accommodate the perceived wireless channel, and evaluating what happens is appropriately termed a cognitive process. This approach includes both awareness of the wireless channel and judgment of the best possible action to take given this knowledge.

Most cognitive computing systems to date have been based on expert systems and neural networks. Such systems can be quite brittle in the face of unknown environments or else they require extensive training.

SUMMARY OF THE INVENTION

It is therefore an object of the present invention to provide a cognitive radio architecture based on genetic algorithms capable of adapting to unknown and unexpected environments.

According to the invention, there is provided a cognitive radio architecture which is based on biologically based models of cognition inspired by child development theories of two-way associative learning through play. The cognitive model of the invention imitates the ability of young minds to adapt rapidly to new situations. Genetic algorithms are well suited for this task because of their ability to find global solutions to changing solution spaces that are often quite irregular. Genetic algorithms are (a) able to synthesize best practices through the crossover operation and (b) enable spontaneous inspiration and creativity through the mutation operation. The multi-tiered genetic algorithm architecture of the invention allows sensing of a wireless channel at the waveform or symbol level, on-the-fly evolution of the radio's operational parameters, and cognitive functions through use of a learning classifier, meta-genetic algorithm, short and long term memory and control.

The invention has application in military and disaster communications, where radio systems must work under changing and unanticipated circumstances and in the presence of hostile jammers and interferences. The invention also has application in civilian radio communication systems such as cellular telephones, where spectrum and battery power are at a premium and in which the radios must continuously adapt to conserve these resources.

BRIEF DESCRIPTION OF THE DRAWINGS

The foregoing and other objects, aspects and advantages will be better understood from the following detailed description of a preferred embodiment of the invention with reference to the drawings, in which:

FIG. 28 is a data map of a standard TCP/IP packet;

FIG. 30 is a datagram of the WCGA information packet sent to the CSM in a TCP payload;

FIG. 32 is a datagram of the WSGA information packet sent to the CSM in a TCP payload;

FIG. 34 is a datagram of the CSM information packet sent to the CSM in a TCP payload.

DETAILED DESCRIPTION OF A PREFERRED EMBODIMENT OF THE INVENTION

Figure 1:
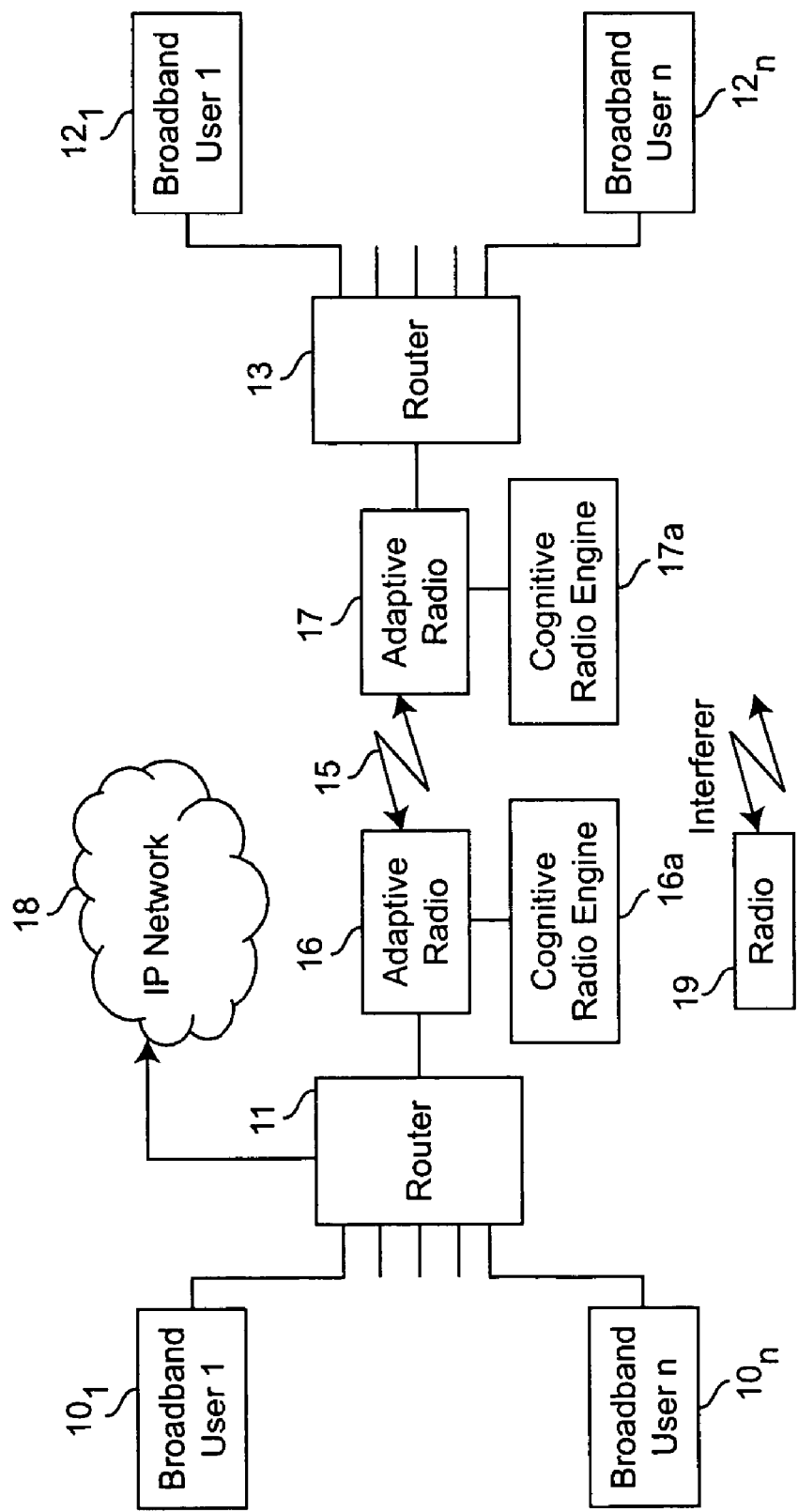
FIG. 1 is a block diagram of an implementation of the cognitive radio engine in a network.

Referring now to the drawings, and more particularly to FIG. 1, there is shown an example of an implementation of the cognitive radio system according to the invention in a network having a broadband wireless RF link. The network comprises a first plurality of broadband users $10_1$ to $10_n$ connected to a first router 11 and a second plurality of broadband users $12_1$ to $12_n$ connected to a second router 13. The first and second routers 11 and 13 are connected by means of a cognitive radio link 15 established by a first adaptive radio 16 controlled by a cognitive radio engine 16a connected to router 11 and a second adaptive radio 17 controlled by a cognitive radio engine 17a connected to router 13. In this example, the router 11 is connected to a general internet protocol (IP) network, represented by a cloud 18. There is present in the illustrated environment a radio 19 which is a source of interference to the cognitive radio link 15. It is the function of the cognitive radio engines 16a and 17a to control their respective adaptive radios 16 and 17 so as to minimize or eliminate the interference generated by the radio 19 to maximize performance without obstructing the operation of radio 19.

Figure 2:
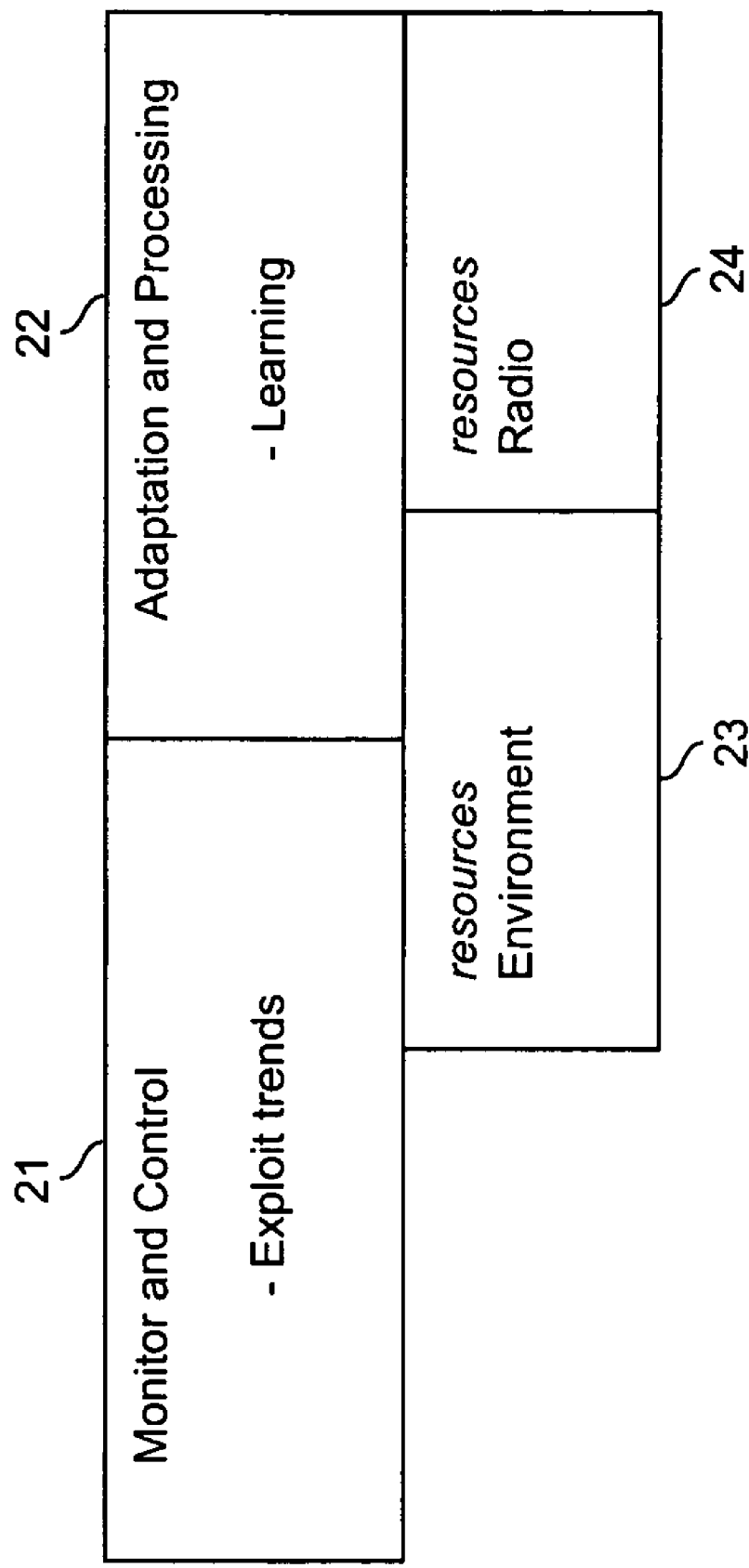
FIG. 2 is a concept-level block diagram of the cognitive radio engine of the invention.
Figure 3:
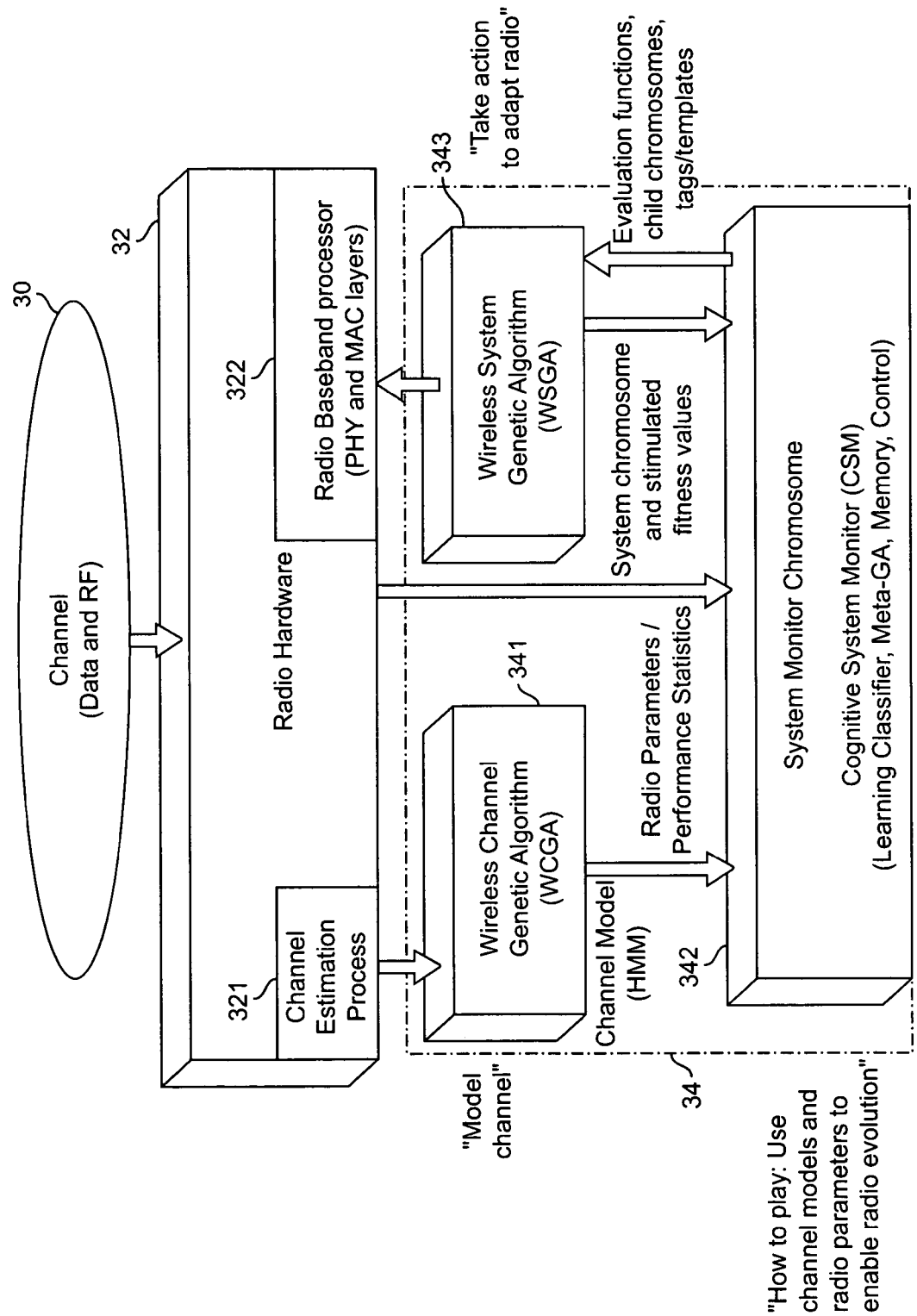
FIG. 3 is a system-level block diagram of the cognitive radio engine of the invention.

FIG. 2 shows in block diagram form the conceptual components of the cognitive engine. These include a monitor and control component 21, the function of which is to exploit trends, an adaptation and process component 22, the purpose of which is learning, and resources components 23 and 24, respectively concerned with the environment and the radio. FIG. 3 shows in more detail the architecture of the cognitive engine. The channel 30, providing data and RF signals, is connected to the radio hardware 32 which, in turn, is connected to the cognitive engine 34. The radio hardware 32, in addition to the usual RF and conversion circuitry, includes a channel estimation process 321 and a radio baseband processor 322. The output of the channel estimation process 321 is input to the wireless channel genetic algorithm (WCGA) module 341 of the cognitive engine 34. This module generates a Hidden Markov Model (HMM) channel model which is input to the cognitive system monitor (CSM) 342. The CSM 342 also receives radio parameters and performance statistics from the radio baseband processor 322. The CSM 342 generates evaluation functions, associated weights, child chromosomes, and templates which are input to the wireless system genetic algorithm (WSGA) module 343. The evaluation functions, weights, child chromosomes, and a template are referred to as the WSGA information packet. The WSGA 343 generates radio parameters which are applied to the radio baseband processor to adapt the radio to the changing environment.

Figure 4:
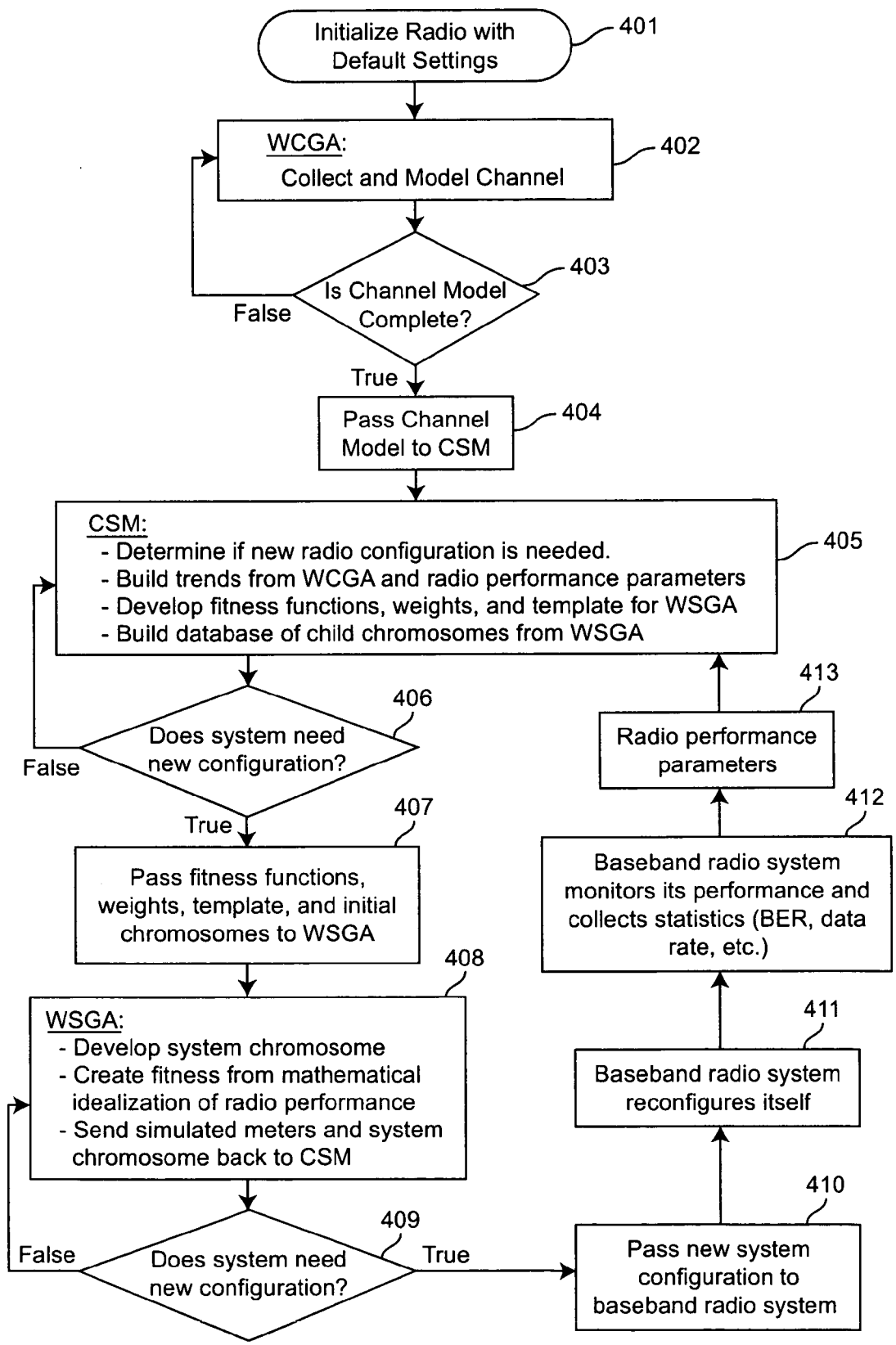
FIG. 4 is a system-level flowchart of the operation of the cognitive radio engine of the invention.

FIG. 4 shows the process implemented by the cognitive engine. The process begins by initializing the radio with default settings in the initialization block 401. The WCGA 341 collects information from the channel estimation process 321 and models the channel in function block 402. A test is made in decision block 403 to determine if the channel model is complete. If not, the process loops back to function block 402, but if the model is complete, the channel model is passed to the CSM 342 in function block 404. In function block 405, the CSM 342 determines if a new radio configuration is needed, builds trends from the WCGA 341 and radio statistics, and develops a WSGA information packet for the WSGA 343. A test is made in decision block 406 to determine if the system needs a new configuration. If not, the process loops back to function block 405; otherwise, a WSGA information packet is passed to the WSGA 343 in function block 407. In function block 408, the WSGA 343 develops a system chromosome and creates fitness from mathematical idealization of radio performance. A test is then made in decision block 409 to determine if the new system developed by the WSGA 343 is close to optimization. If not, the process loops back to function block 408; otherwise, the new system configuration is passed to the baseband radio system 322 in function block 410. The baseband radio system 322 then reconfigures itself in function block 411. Thereafter, the radio system monitors its performance and collects statistics (bit error rate (BER), data rate, etc.) in function block 412. These radio performance parameters are collected in function block 413 and input to the CSM at function block 405. The process shown in this flowchart is cyclical and runs continuously.

Figure 5:
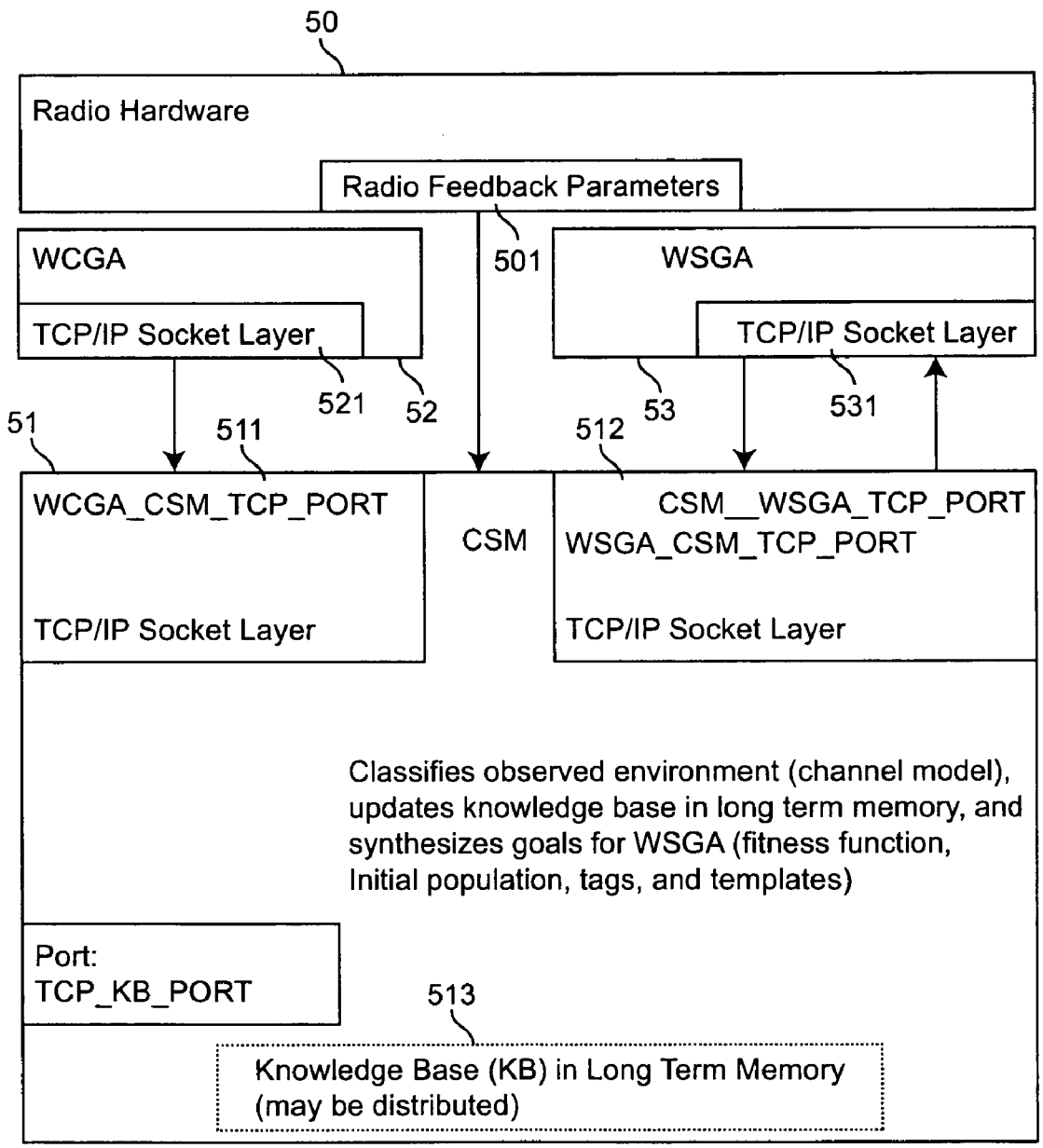
FIG. 5 is a block diagram of the cognitive system monitor (CSM) according to the invention.

FIG. 5 is a block diagram of the CSM showing the functional relationships of the several components of FIG. 3. The radio hardware, here shown as block 50, generates radio feedback parameters 501 which are input to the CSM, here shown as block 51. The CSM 51 is also connected to the WCGA and WSGA, here shown as blocks 52 and 53, respectively. More particularly, the WCGA 52, through its TCP/IP (transport control protocol/internet protocol) socket layer 521, interfaces with the corresponding socket layer 511 of the CSM 51, while the WSGA 53, through its TCP/IP socket layer 531 with the corresponding socket layer 512 of the CSM 51. The CSM 51 includes, among other things, a knowledge base (KB) in long term memory (LTM) 513. The CSM 51 classifies observed environment (i.e., the channel model), updates the knowledge base in long term memory, and synthesizes an information packet for the WSGA (e.g., fitness function, initial population, weights, and templates). TCP_KB_PORT is an optional feature to allow socket-layer communications with LTM stored on a remote radio system in a distributed implemenation.

Figure 6:
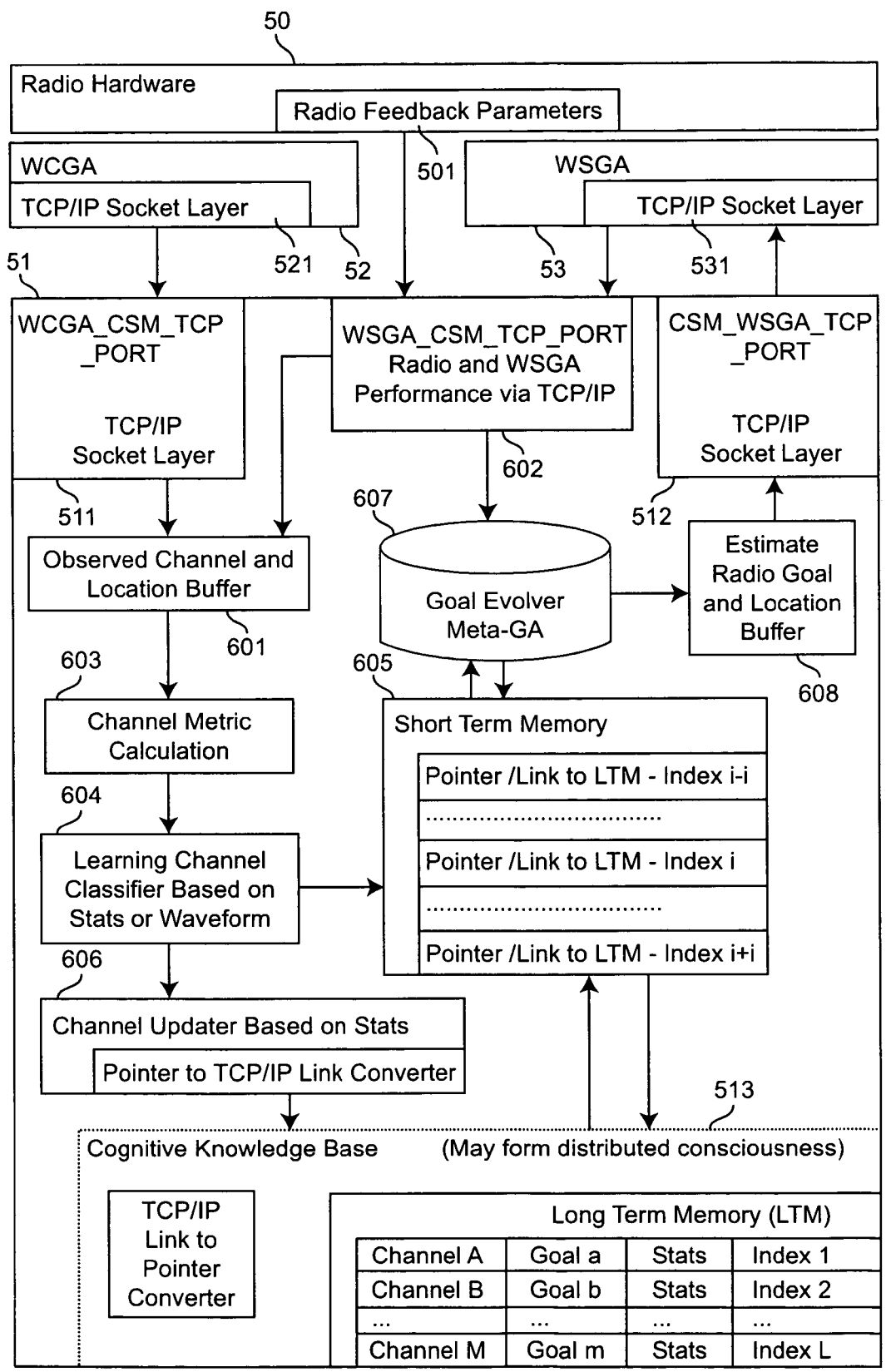
FIG. 6 is a detailed block diagram of the CSM according to the invention.

FIG. 6 shows in more detail the structure of the CSM 51, and in this figure like reference numerals to those in FIG. 5 represent the same of similar components. An observed channel and location buffer 601 receives input from the WCGA 52 via the TCP/IP socket layer 511 and radio parameters from the radio and WSGA performance API 602 (application program interface). The data in this buffer is supplied to a channel statistics processor 603. The statistics computed by the processor 603 are input to a learning channel classifier 604 which, in turn, provides outputs to a short term memory (STM) 605 and a channel updater 606. The channel updater 606 generates a pointer to a TCP/IP link converter in the cognitive knowledge base in the long term memory (LTM) 513. The LTM 513 interfaces with the short term memory (STM) 605 which, in turn, interfaces with the goal evolver 607. The goal evolver 607 also receives input from the radio and WSGA performance API 602 and provides an output to the estimated radio goal and location buffer 608. The data in this buffer is provided to the WSGA 53.

The CSM 51 is an evolutionary algorithm that is the core of the cognitive radio intelligence and directs all knowledge gained from the sensing processes to the adapting processes. The CSM 51 is a meta-GA (genetic algorithm), serving as short and long term memory to understand and utilize past trends in system behavior. The CSM 51 is the creative side of the cognitive radio brain. The WSGA 53 takes direction from the CSM 51 and performs its own genetic algorithm (GA) to redesign the radio configuration. The WSGA 53 is the logical side of the cognitive radio brain. The WSGA 53 acts upon a chromosome containing parameters like transmitter power, frequency, bandwidth, modulation, channel coding, etc. It understands the regulatory and physical environment and passes a templates to the GA informing the GA what parameters may be legally altered and what parameters should be left alone, based on the knowledge gained from the best trends. The WSGA 53 also receives the fitness evaluation to direct the algorithm in how it should attempt to evolve. For example, the fitness could be a measure of the minimum BER, minimum power consumption, maximum carrier to noise ratio (C/N), minimum latency, maximum data rate, or a combination of these. The GA will attempt to optimize these fitness functions. Depending on what information the CSM 51 receives from the system and the WCGA 52 sensing algorithm, the fitness function may change to achieve new goals. The WSGA 53 works within the knowledge established by the CSM 51 to find a configuration that should work. The WSGA 53 then passes the new radio configuration to the RF and digital baseband equipment, which then reconfigures itself. After the radio tries the new configuration, the CSM 51 will evaluate the radio's performance to assess the success of the configuration. If the CSM 51 determines that the radio's performance is not optimum, it will inform the WSGA 53 that a new configuration is needed.

The task of the WCGA 52 is to sense the environment and model it as accurately as possible to provide information about the multipath environment or other interferences that can cause errors in the channel. The environmental information is then sent to the CSM 51 for processing. The CSM 51 can then use the model to evaluate what functions are applicable to the current channel. Based on the environment, the CSM 51 can determine how best to analyze the system configuration, what performance to attempt to achieve, and how best to set the fitness evaluation function for the WSGA 53 so that the fitness of the system chromosome will converge upon the appropriate radio settings.

As an example, consider a radio designed for the Unlicensed National Information Infrastructure (UNII) band. The WCGA 52 first models the channel and then the CSM 51 estimates the maximum data rate achievable within the system given its knowledge of that channel. The CSM 51 will inform the WSGA 53 to use the data rate as its fitness evaluation and pass the maximum data rate as the fitness goal to achieve. Using chromosome coding and genetic tagging of the information requested, the CSM 51 will also tell the WSGA 53 that it is limited by the frequency and bandwidth of the UNII band. The WSGA 53 will perform the GA to produce new system configurations and test them based on two metrics: does the new configuration meet the regulatory requirements and does it achieve the data rate requirement? When the WSGA 53 is satisfied that the regulatory requirements are met and that the data rate requirement is close to being achieved based on the fitness evaluation that it was provided by the CSM 51, it sends the information to the radio for reconfiguration. Artificial intelligence researchers would consider the WSGA 53 as working with "simulations", while the CSM 51 monitors "reality", which means that the simulated results will often deviate from the actual radio performance. Therefore, the CSM 51 will have to monitor how the radio performs so that it can instruct the WSGA 53 if a new configuration is required.

Figure 7:
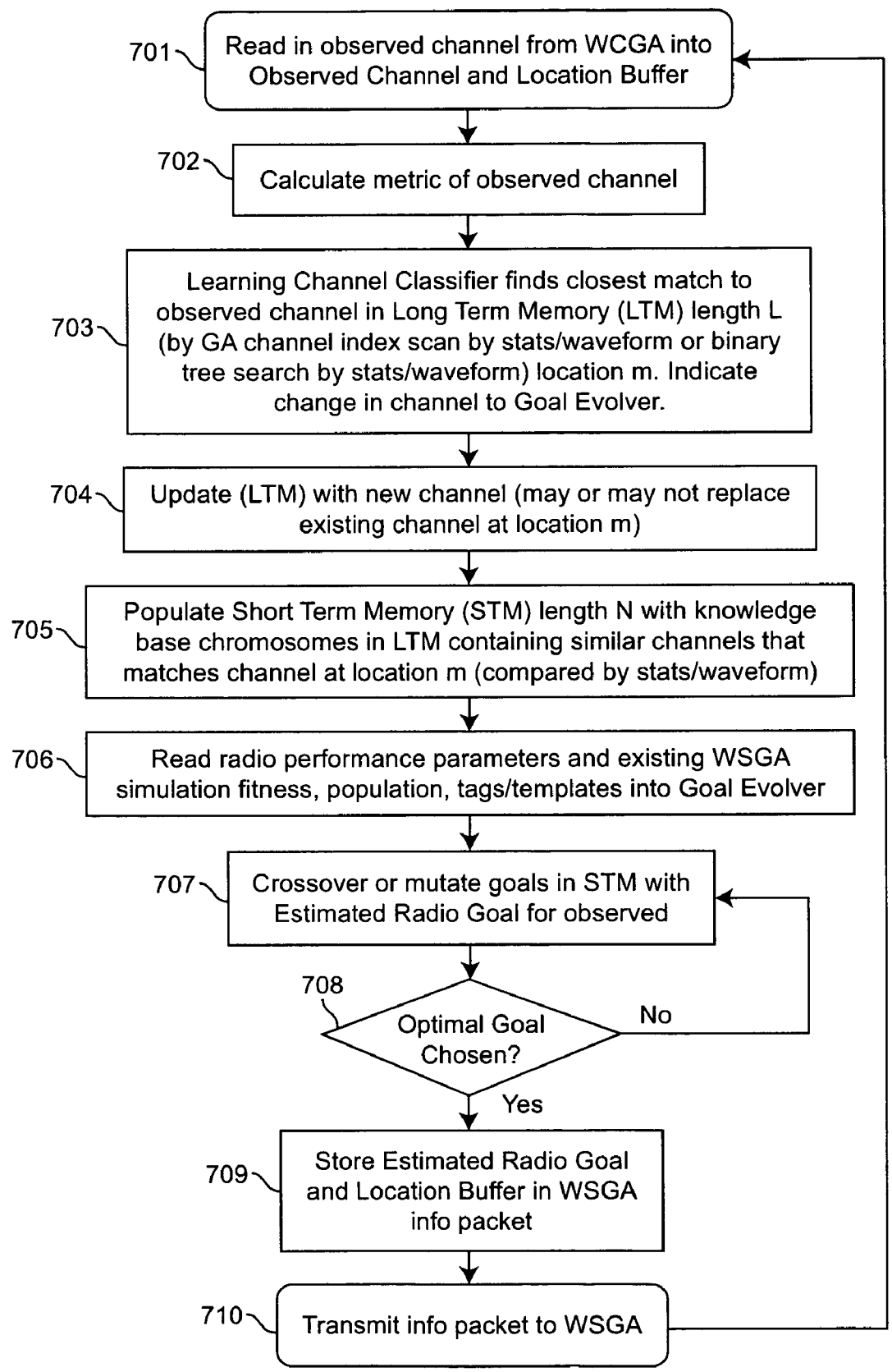
FIG. 7 is a flowchart of the operation of the CSM according to the invention.

The process implemented by the CSM 51 is illustrated in the flowchart of FIG. 7, to which reference is now made. The process begins in input block 701 where the observed channel from the WCGA 52 is read into the observed channel and location buffer 601. The channel metric calculator 603 then calculates the ranking metric of the observed channel in function block 702. The ranking metric can be anything that distinguishes the channel like average bit error rate or average burst error length, which is the current metric being used. The learning channel classifier 604 finds the closest match to the observed channel in long term memory (LTM) in function block 703. This is done by GA channel index search by the ranking metric or by binary tree search by the ranking metric. Any change is indicated to the goal evolver 607 via the short term memory (STM) 605. The LTM 513 is updated in function block 704. The STM 605 is populated in function block 705 with knowledge base chromosomes in LTM 513 containing similar channels. In function block 706, radio performance parameter and existing WSGA simulation fitness, population, tags and templates are read into the goal evolver 607. Goals in the STM 605 are crossed over or mutated with estimated radio goal for the observed channel in function block 707. Then, in decision block 708, a test is made to determine if the optimal goal has been chosen. If not, the process loops back to function block 707, but if so, the data in estimated radio goal and location buffer 608 is formatted into an information packet for the WSGA 53 in function block 709. The formatted packet is then transmitted to the WSGA 53 in output block 710, and the process returns to input block 701. The algorithm is a never-ending loop while the radio is operational to provide continuous evolution of the radio's settings to either continually search for a more optimal solution, or to adapt the radio in a time-varying channel.

Figure 8:
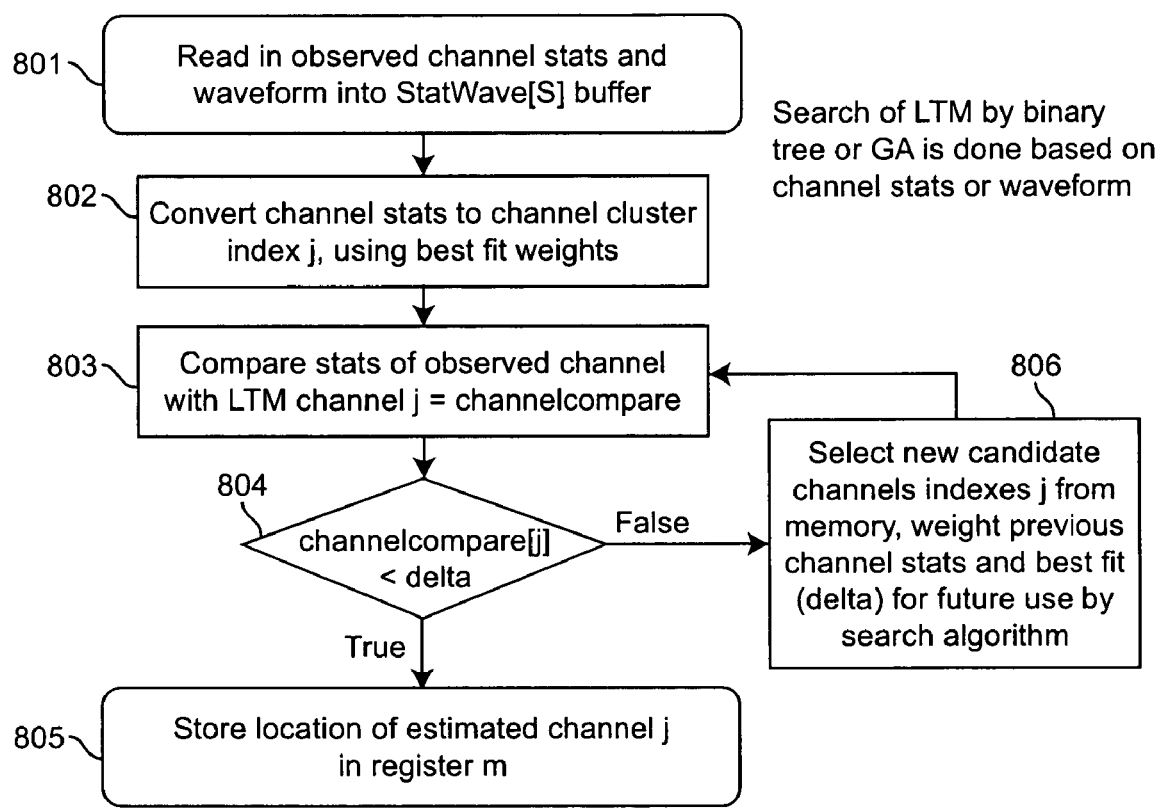
FIG. 8 is a flowchart showing the "Learning Channel Classifier" routine in the process of FIG. 7.

FIG. 8 is the flowchart for the learning channel classifier routine of function block 703 in FIG. 7. The input 801 is the computed ranking metric from the channel statistics processor 603. The channel statistics are converted to channel cluster index j, using best fit weights, in function block 802. The statistics of the observed channel are compared with those of the corresponding channel stored in long term memory 513 in function block 803. A test is made in decision block 804 to determine if the comparison matches within a predetermined difference (delta). If so, the location of the estimated channel j is stored in register m, a pointer in the CSM to a member of LTM 513, in function block 805; otherwise, a new candidate is selected from LTM 513 in function block 806, and a return is made to function block 803.

Figure 9:
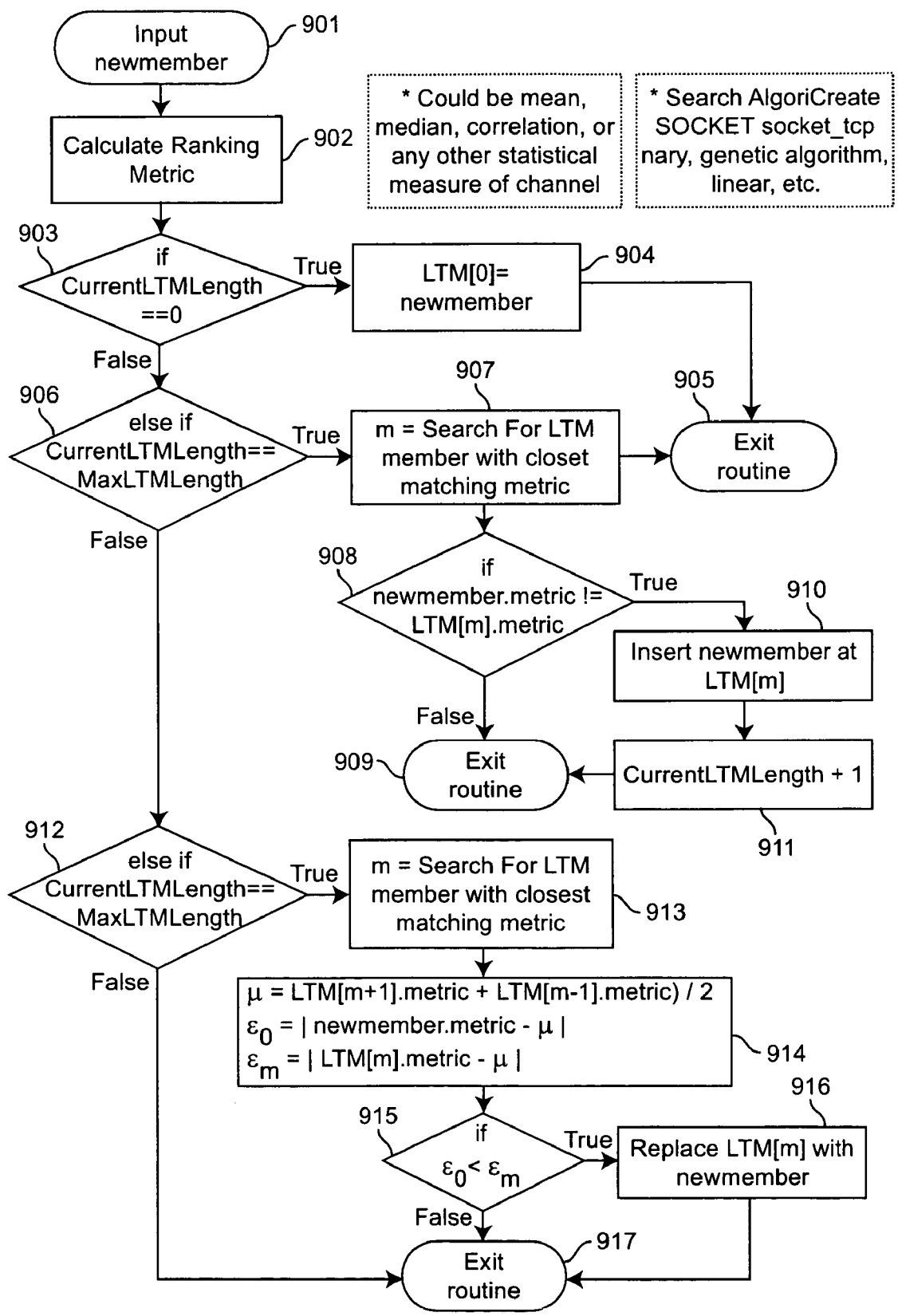
FIG. 9 is a flowchart showing the "Update LTM" routine in the process of FIG. 7.

FIG. 9 is the flowchart for the update LTM routine in function block 704 in FIG. 7. The input 901 is new member. A ranking metric of the observed channel is calculated in function block 902. A test is made in decision block 903 to determine if the current LTMLength is equal to zero. If it is, the observed channel is placed in the first position of LTM in block 904 and the function exits at 905. Otherwise, the length of LTM is compared the MaxLTMLength, the maximum possible length of the LTM member, in decision block 906. If the current length is less than the maximum length, function block 907 determines what member of the population, pointed to by register m has the closest matching ranking metric to the observed channel. If the metrics are the same as determined in decision block 908, there is no need to update LTM, so the function exits 909. If the metrics are different, the observed channel is inserted into LTM at position pointed to by m at block 910. The current LTM length is then incremented by function block 911. It is important to note that the channel that matched closest to the observed channel is not replaced, the new channel is just inserted at this position to maintain proper order based on the ranking metric in LTM.

If the current LTM length equals the maximum LTM length from block 912, block 913 finds the closest matching member of LTM like block 907 did. The differences in the metrics between the observed channel and the two surrounding channels of LTM member m is calculated in block 914 as $\epsilon_0$ and the difference between LTM member m and its two surrounding neighbors is calculated as $\epsilon_m$, where μ is the Euclidean distance between the LTM members surrounding m. Decision block 915 determines if $\epsilon_0$ is less than $\epsilon_m$, whereby the current member of LTM at position m is replaced by the new channel in block 916 and the function exits at 917; otherwise, the current LTM member is not replaced and the function exits at 917. This algorithm ensures that LTM exists of observed channels that maximize the distance between any two members to provide as wide a scope of the possible channels as possible.

Figure 10:
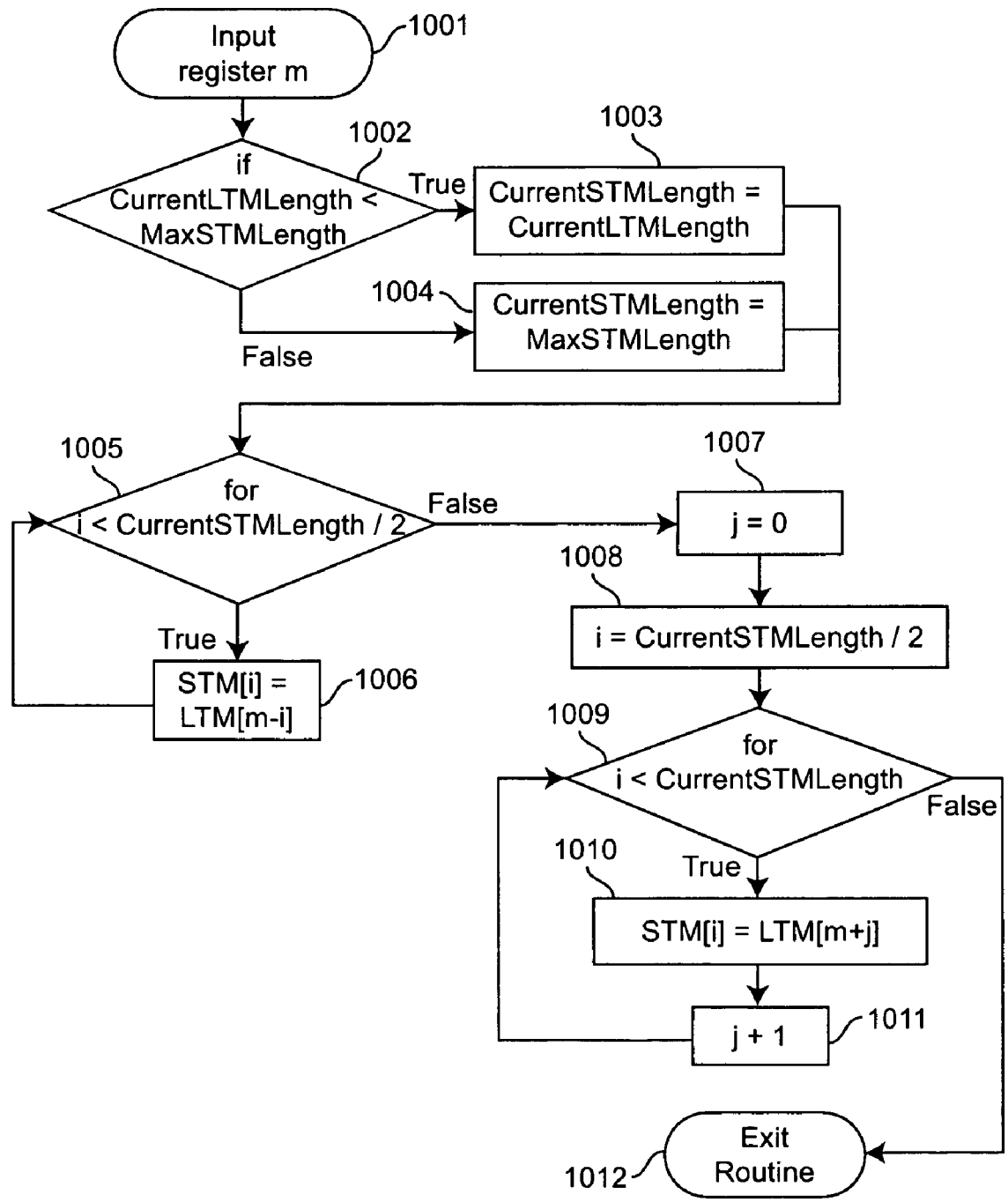
FIG. 10 is a flowchart showing the "Populate STM" routine in the process of FIG. 7.

FIG. 10 is the flowchart for the populate STM routine in function block 705 in FIG. 7. The register m as developed in block 704 is passed to this function in block 1001. If the current LTM length is less than MaxSTMLength, the maximum number of members short term memory (STM) can hold, as decided in block 1002, then block 1003 sets CurrentSTMLength, the current length of STM, to the current length of LTM. Otherwise, block 1004 sets the current STM length to the maximum STM length. Block 1005 begins a loop which takes LTM members at m minus i, an index value that starts at 0 and increments in steps of 1 to CurrentSTMLength/2, and places them into STM in block 1006. Block 1007 initializes j, another index value, to zero. Index i is then set in block 1008 to the middle of the current STM member to populate the upper half of STM. If the index i is less than CurrentSTMLength, as determined in decision block 1009, block 1010 populates the upper half of STM by member of LTM at m plus j. Block 1011 increments index j. When loop 1009 exits, STM is fully populated with the LTM members surrounding the closest matching member of LTM to the observed channel, m and the routine exits at 1012.

Figure 11:
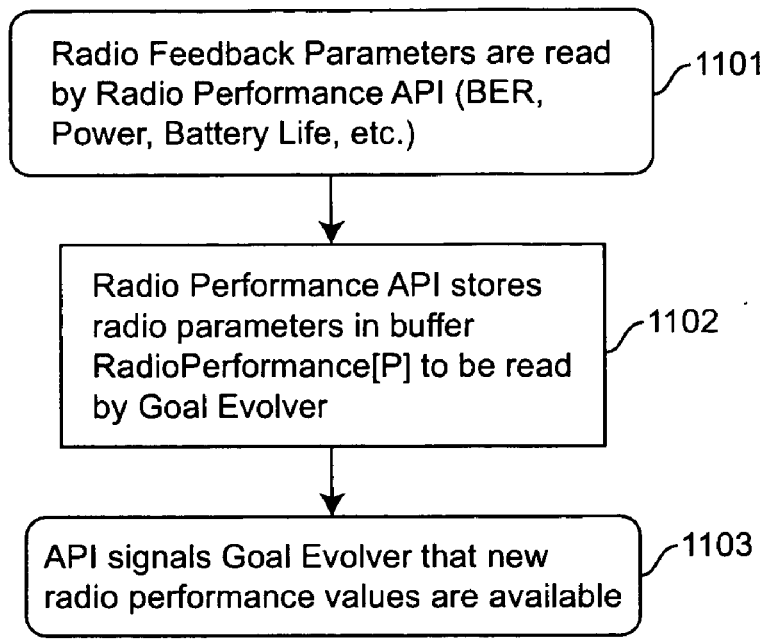
FIG. 11 is a flowchart showing the "Radio Performance Read" routine in the process of FIG. 7.

FIG. 11 is the flowchart for the read radio performance parameters routine in function block 706 in FIG. 7. The inputs 1101 are the radio feedback parameters read by the radio performance API (application program interface). These include such things as BER (bit error rate) power, battery life, etc. The radio performance API stores the radio parameters in a buffer to be read by the goal evolver 607 in function block 1102. The output 1103 is a signal to the goal evolver 607 that new radio performance values are available.

Figure 12:
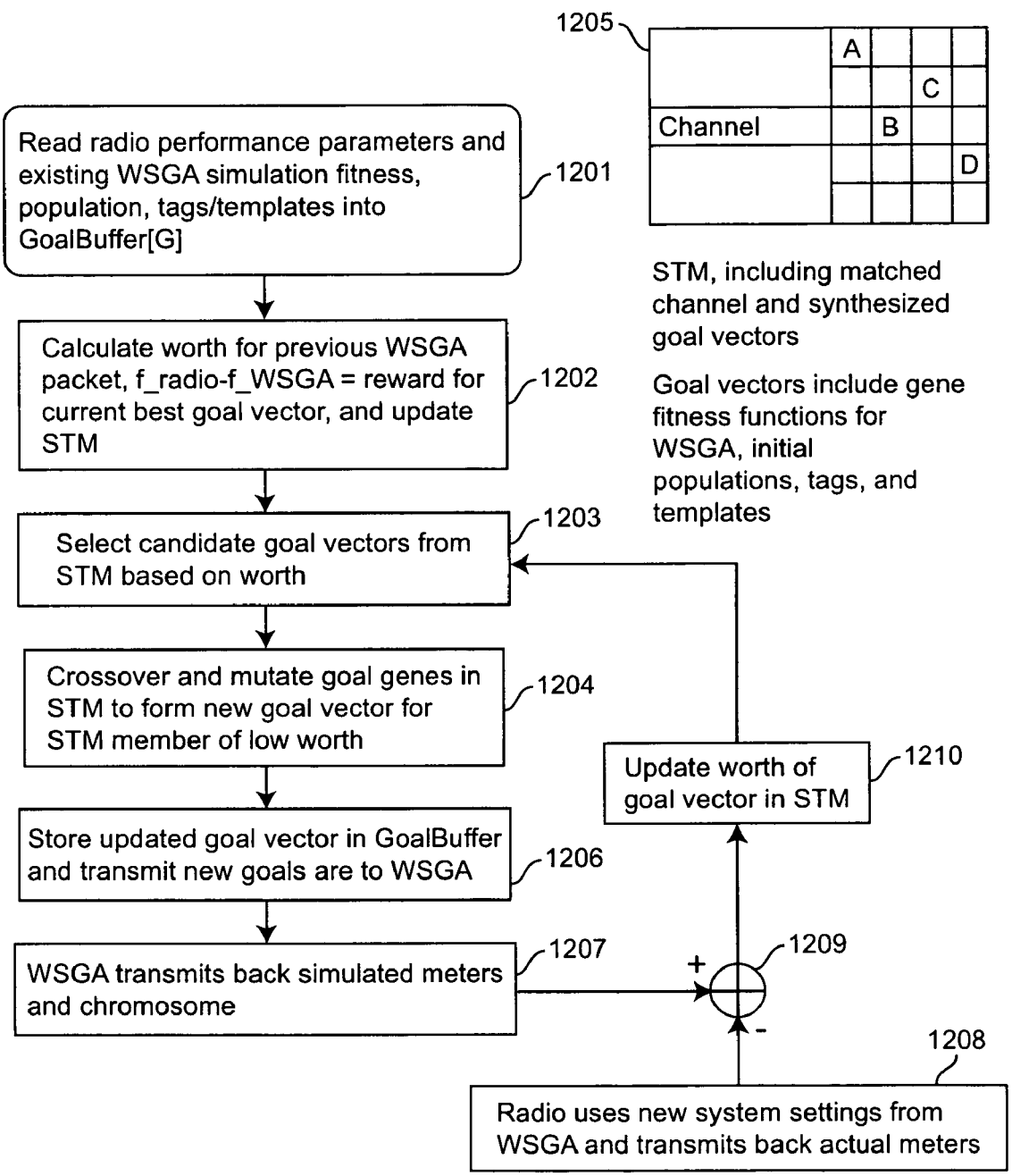
FIG. 12 is a flowchart showing the "Goal Optimizer" routine in the process of FIG. 7.

FIG. 12 is the flowchart for the goal optimizer routine in function block 707 and decision block 708 in FIG. 7. The inputs 1201 are the radio performance parameters and existing WSGA simulation fitness, population, and templates. Block 1202 compares the simulated meters, $f_{WSGA}$ with the actual observed parameters from the radio, $f_{radio}$. The differences shows how far the WSGA simulation was from the actual operation of the radio. From here, it can be determined how necessary a new configuration is required, or learn about behavior to avoid or promote in the future. Block 1203 ranks the members of STM in respect to two objectives: similarity and utility (drawing from decision theory vocabulary). The similarity functions determine how close the observed channel is to each member in the short term memory, and the utility function determines how successful each member of STM has been in the past. Poor performing members of memory lose worth over time and successful members gain worth. The candidate member of STM is that member who maximizes both similarity and utility. In the terms of FIG. 12, the goal vectors refer to the information sent to the WSGA about what the channel is and how it should be evaluated (fitness functions, weights, template, and child chromosomes).

The STM then undergoes manipulation through a genetic algorithm in block 1204, which is an evolutionary process that attempts to alter the goal vectors of the poor performing channels by combining successful pieces of goal vectors from other members of STM. Block 1205 illustrates how a member of STM may look, with the channel on the left, which is used to determine the similarity function, and goals in the vector on the right. In this case, the genetic algorithm in 1204 attempts to alter the goal vectors of the listed channel by combining goals A, B, C, and D from different members of STM. These become the new goal vector associated with that channel, which will hopefully produce a better utility function than the previous goal vector. This process attempts to "play" with past behavior to learn better ways of behaving in the future.

The STM member that was chosen for the highest similarity and utility is then sent to the WSGA to create a new set of radio parameters in block 1206. Block 1207 shows the WSGA sending the new system chromosome back to the CSM as well as the simulated parameters. Block 1208 shows the radio transmitting the actual parameters associated with the new system chromosome back to the CSM. Blocks 1207 and 1208 run independent of the CSM, and so they must be asynchronously timed where the information coming from either entity (the WSGA or the radio) can come at any given time. When the radio parameters are returned, they are compared to the simulated parameters by observing the differences between the simulated and the actual parameters at function block 1209. This information is then used by block 1210 to update the worth associated with the STM member used to generate the current system chromosome. If the real system performs worse than the simulation, it indicates a problem with the STM goal vector, and the worth of that STM member is decreased. If the simulated and actual meters are the same, or the actual meters work better than the simulated meters, the worth of the associated STM member is increased. This method is slightly counter-intuitive, because an STM member can be rewarded if the real system performs better than expected, which indicates that the simulation environment failed; however, in actual operation, it does not matter if the simulation is wrong as long as the values it produces works, so the reward is allowed.

Note that there is no exit to this routine. As stated above, it runs asynchronously and constantly takes in information from the radio, the WSGA, and the rest of the CSM to continually update and adjust the members' goal vectors in memory.

Figure 13:
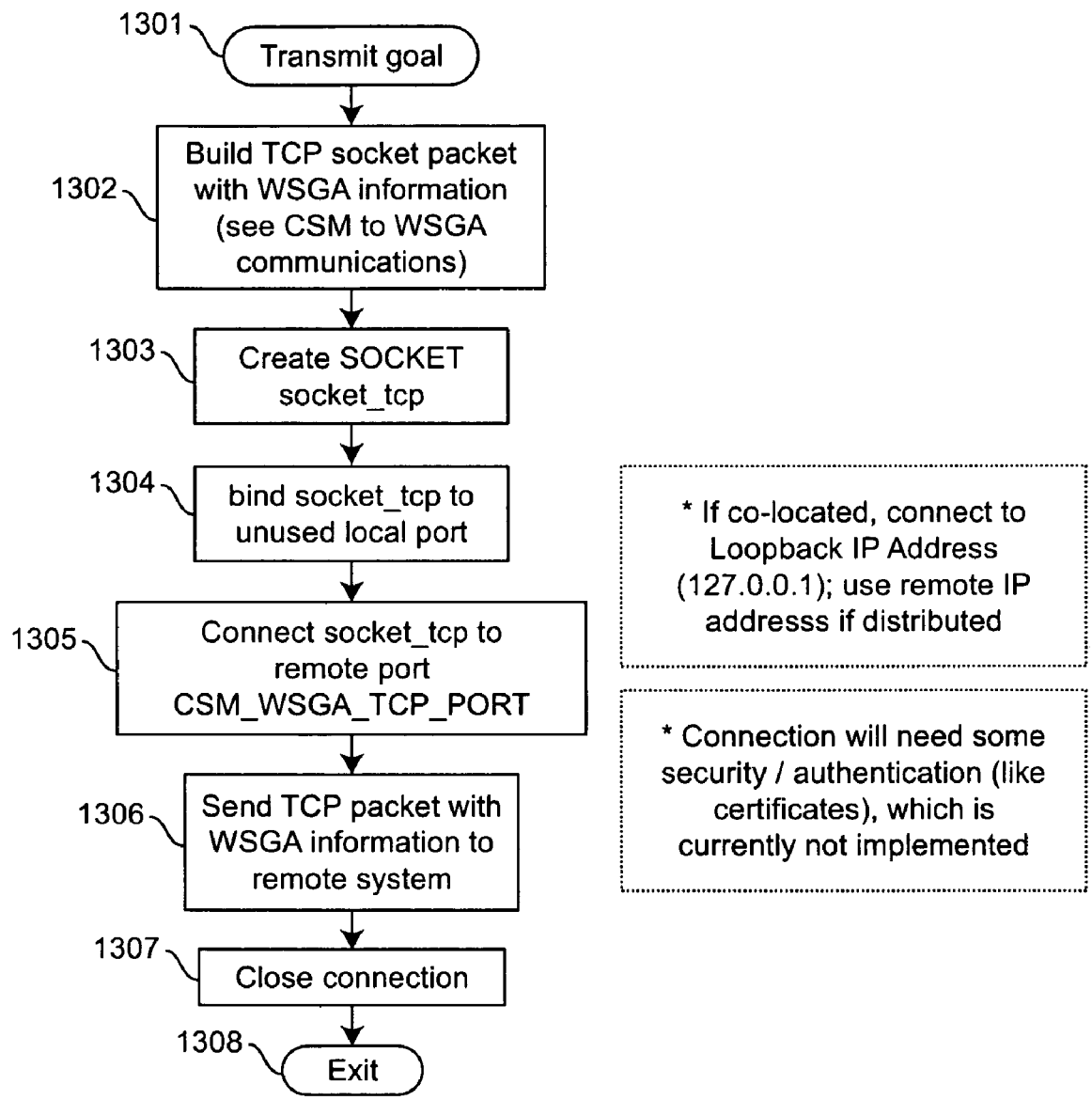
FIG. 13 is a flowchart showing the "Transmit Goal" routine in the process of FIG. 7.

FIG. 13 is the flowchart for the transmit goal routine in output block 710 in FIG. 7. The input 1301 is goal in buffer 608. A TCP (transport control protocol) socket packet with WSGA information is built in function block 1302. A socket is created in function block 1303, and the created socket is bound to an unused local port in function block 1304. The socket is then connected to a remote port in function block 1305, and the TCP packet is sent with the WSGA information to the remote system in function block 1306. The process ends by closing the connection in function block 1307 and exiting at block 1308.

Figure 14:
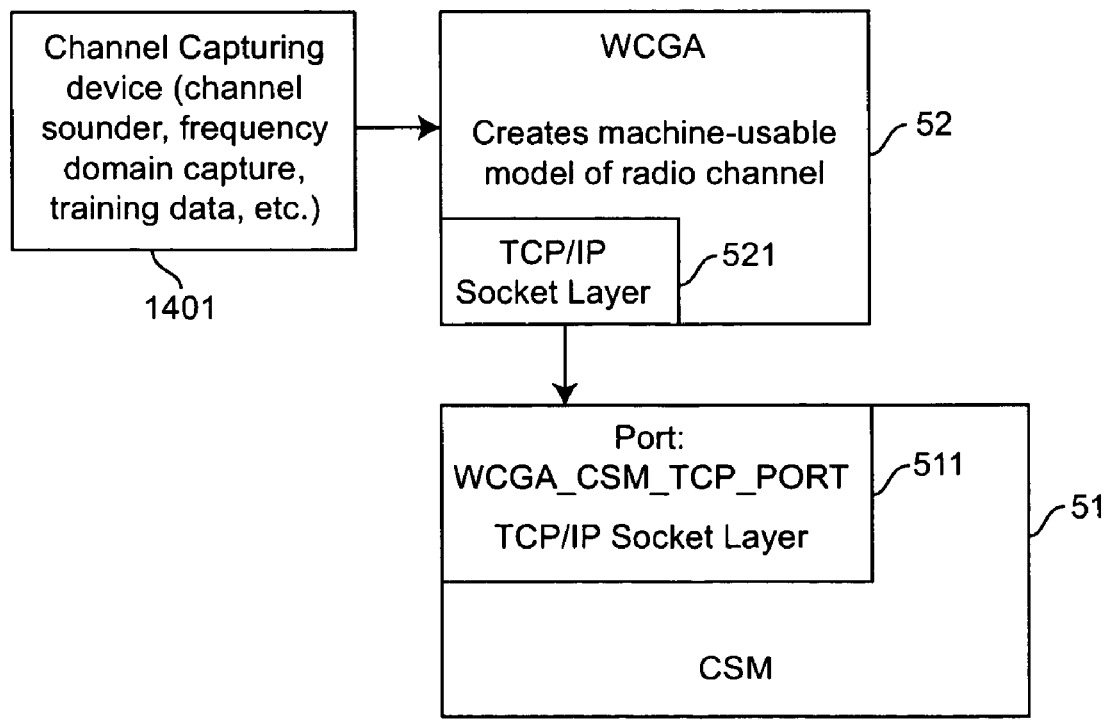
FIG. 14 is a block diagram of the wireless channel genetic algorithm (WCGA) according to the invention.

The wireless channel genetic algorithm (WCGA) is, in general, a mechanism by which the channel is observed and modeled for use in the CSM. The current instantiation of the WSGA involves the modeling of any wireless channel error using the compact form of a Hidden Markov Model (HMM). FIG. 14 is a block diagram of the WCGA. A channel capturing device 1401 (i.e., the channel estimation process 321 in FIG. 3) provides the input to the WCGA 52. The channel capturing device can be any known method of modeling a channel using devices such as a channel sounder, a frequency domain capturing device (Fast Fourier Transform device), training data, etc. The WCGA creates a machine-usable model of the radio channel. This is transmitted via the TCP/IP socket layer 521 to the corresponding TCP/IP socket layer 511 of the CSM 51.

Figure 15:
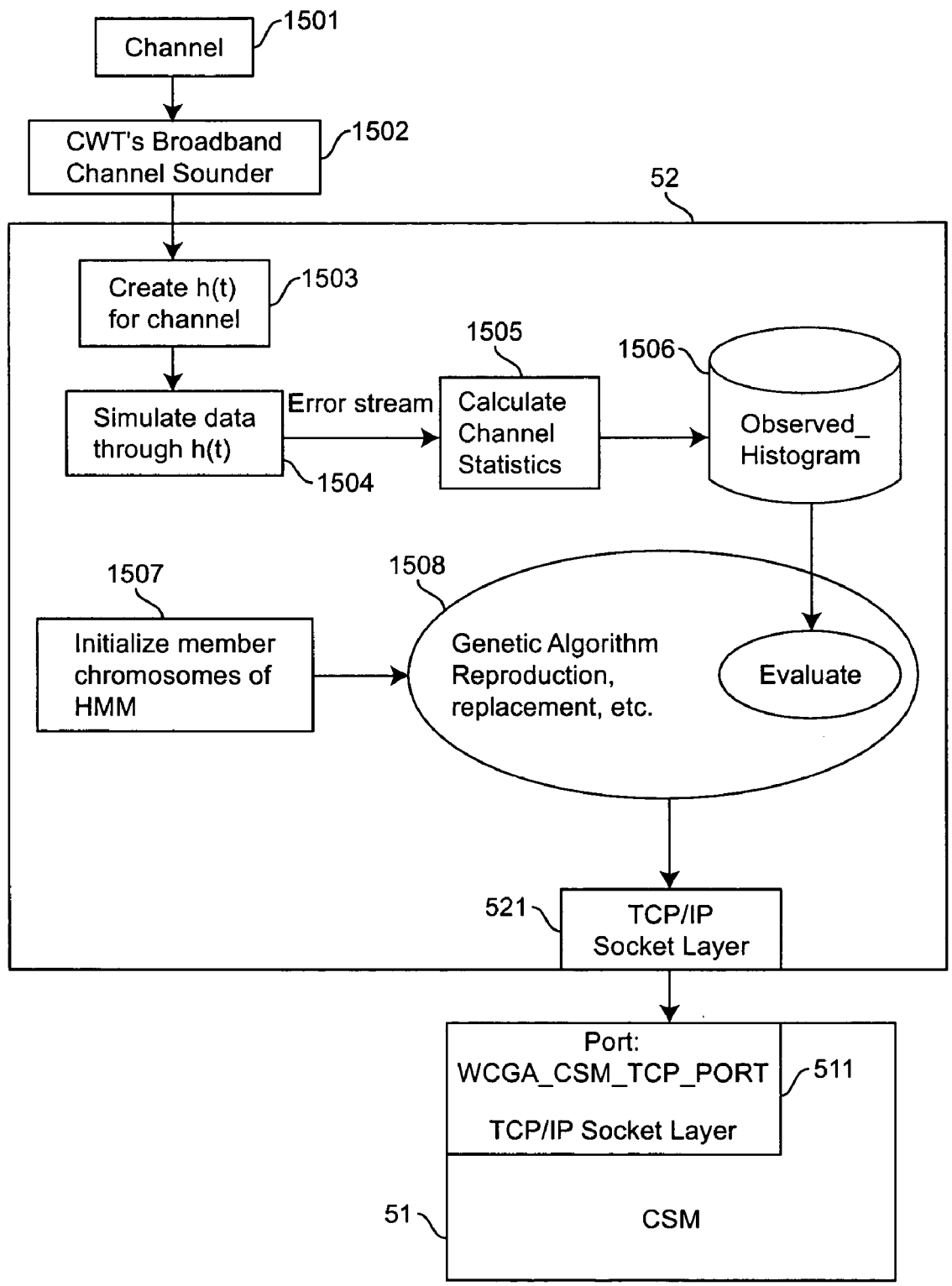
FIG. 15 is a block diagram illustrating a specific instantiation of the WCGA for modeling bust errors with genetic algorithm (GA) trained Hidden Markov Models (HMMs)

A specific instantiation of the WCGA is shown in FIG. 15. This instantiation models burst errors with GA-trained HMMs. The WCGA uses an error stream for the input, which is a train of symbols representing the number of bit errors per symbol. For the WCGA to produce an accurate model, many thousands of error symbols must be collected, which would require a long training sequence, taking both time and bandwidth. A more compact and efficient approach to channel modeling is to utilize the information collected by the channel sounder. While the channel sounder response can provide an immediate understanding of the channel, the data received from the sounder is large and bulky. By using the channel sounder response, a model of the channel is derivable by simulating the channel as a filter with an impulse response derived from the channel sounder. A random bit sequence passed through the simulated channel will produce an error sequence. Because we are interested in a statistical model of the channel, we can use the simulated channel instead of the error sequence. The Hidden Markov Model (HMM) of the channel developed by either a true error sequence or a simulated error sequence is still a statistical representation of the channel. However, this representation is very small compared to the channel sounder data and is capable of representing the channel equally well.

The channel, 1501, is received by a channel sounder 1502, in this case the broadband channel sounder developed at the Center for Wireless Telecommunications. This channel sounder uses impulse transmitted from one radio and is captured by the sounder on another radio using a sliding correlator sounding technique, which captures a small amount of energy from the pulse at different offsets. Because the transmitted pulse is repetitious and the channel is assumed stationary, after K number of pulses (in this case, 40000), the entire pulse has been properly sampled. This method is a way to use narrowband receiver techniques and parts to capture a broadband signal.

The channel sounder response is in the form of a waveform representative of the transmitted impulse, and which contains information about the channel. Block 1503 takes this impulse and converts it to a linear time invariant (LTI) model of the channel, h(t), by down-converting the signal to baseband. Simulated data is then convolved through the LTI model in block 1504, out of which an error stream comes. The error stream represents what transmitted symbols would be received as good symbols and which would be error symbols. Block 1505 takes the error stream and calculates statistics stored in Observed_Histogram of block 1506.

Figure 18:
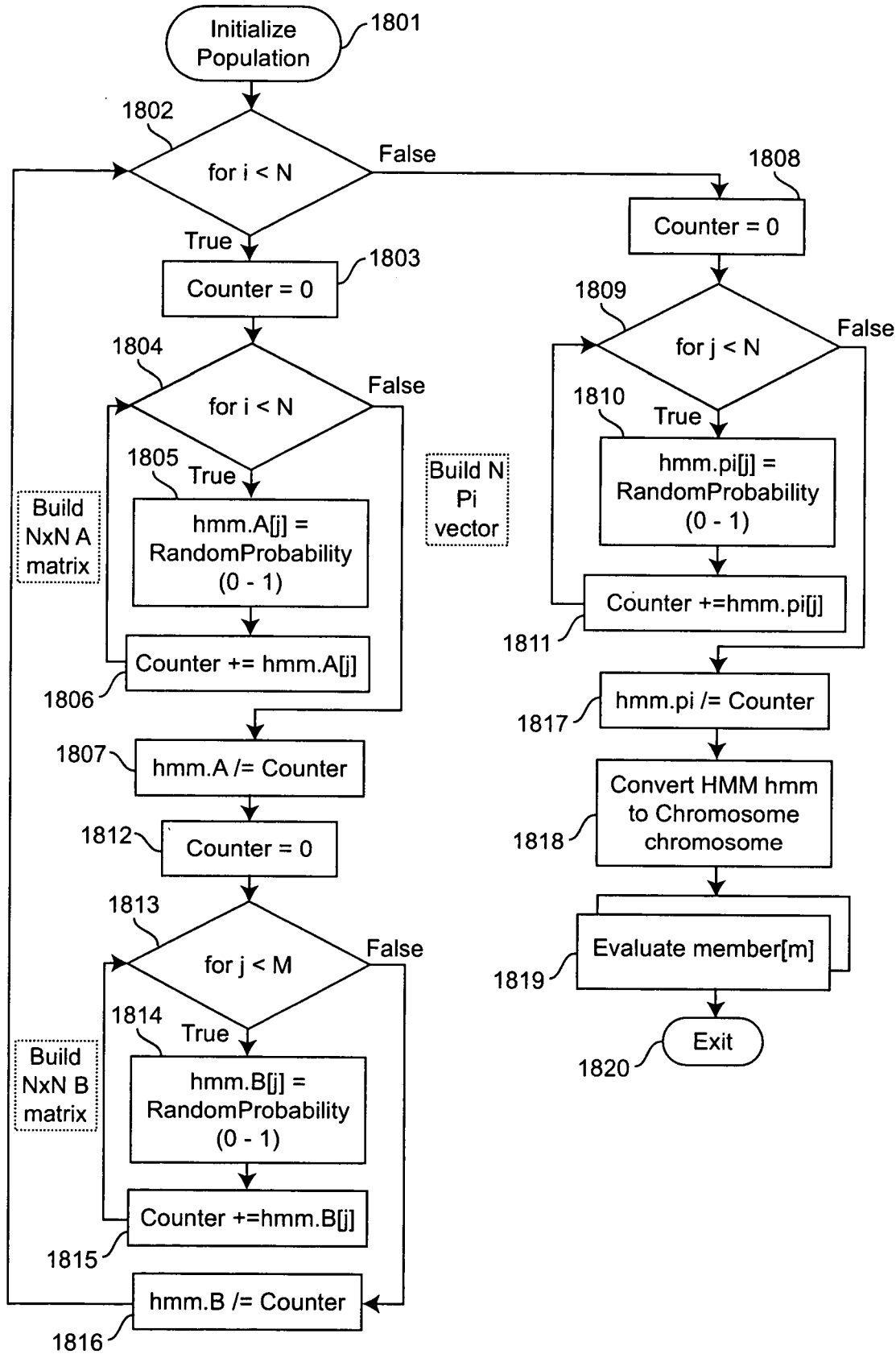
FIG. 18 is a flowchart of the "Initialize Population" routine in the process of FIG. 17.

Block 1507 then generates a randomly initialized WCGA chromosome population according to FIG. 18, which is used to start the genetic algorithm (GA) of block 1508. The GA performs standard crossover and mutation operations and evaluates each chromosome against the observed channel histogram in block 1508 by creating a channel histogram from the HMM and finding the sum of the differences between each point in the histogram as described in FIG. 19. The best fitness is the one closest to zero. After so many generations, the GA exits and transmits the final HMM model to the CSM via the TCP/IP socket layer of block 521.

Figure 16:
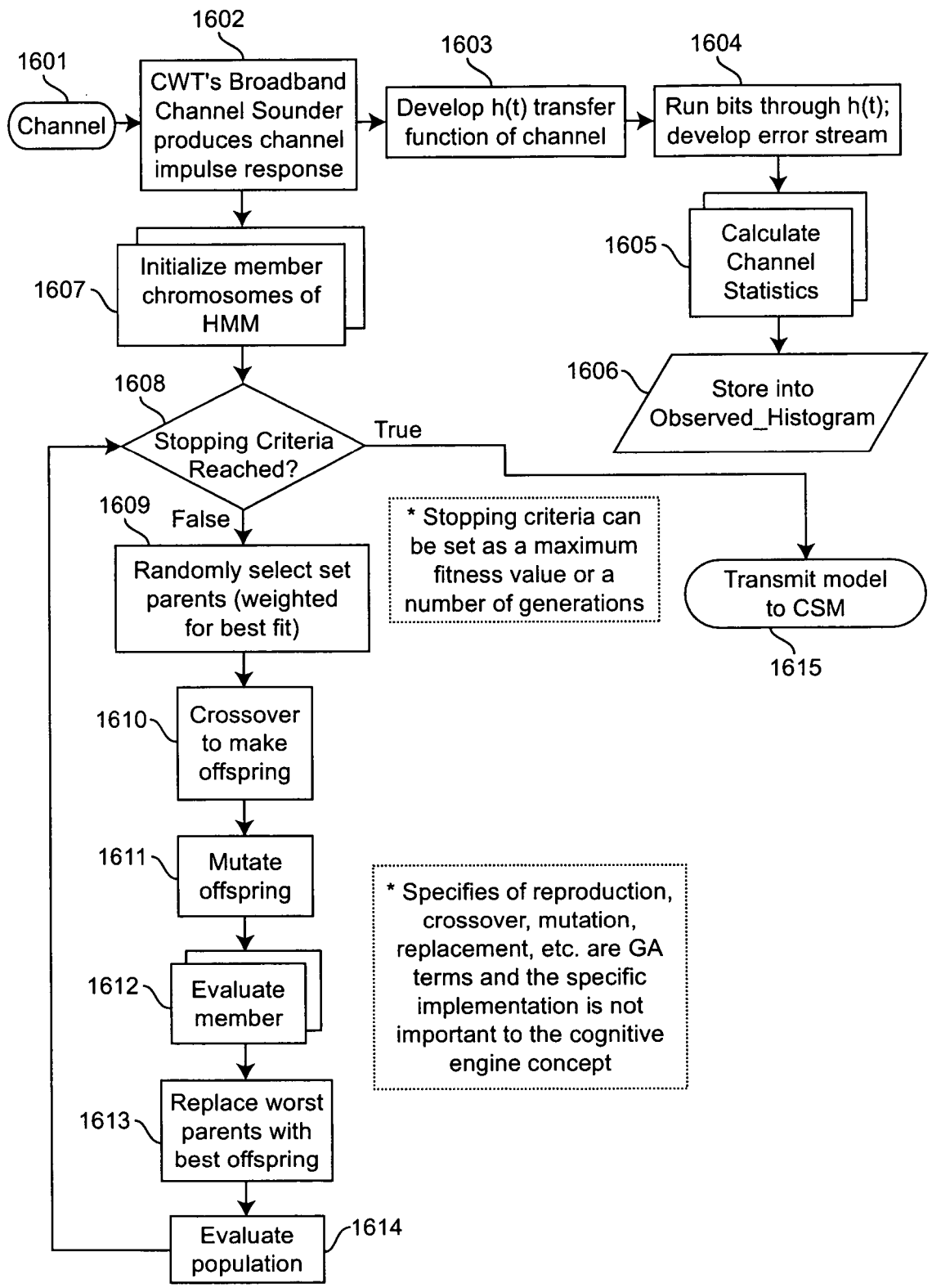
FIG. 16 is a flowchart of the operation of the WCGA according to the invention.

FIG. 16 is a flow chart of the process implemented by the WCGA. The input 1601 is the channel information. The CWT's Broadband sounder in block 1602, as described by block 1502, is used to create a channel impulse response, from the sampled pulse. Like blocks 1503 and 1504, block 1603 develops the mathematical representation, h(t), of the channel and block 1604 uses h(t) to generate an error stream. Block 1605, like 1505, calculates the channel statistics as described in FIG. 17, and the histogram from the channel statistics is stored in block 1606 as the Observed_Histogram. Block 1607 randomly initializes a population of HMM chromosomes according to the routine of FIG. 18.

Block 1608 starts the genetic algorithm loop, which runs until a specified stopping criteria like a limited number of generations (the currently used method), or a certain minimum desired fitness value. A selection process is used in block 1609, which can be any GA selection process such as tournament or roulette wheel, to choose parents for mating. The parents are then genetically manipulated through crossover, block 1610, and mutation, block 1611, to create a new set of offspring. The offspring are then evaluated in block 1612 according to the routine in FIG. 19. The worst members of the current generation are then replaced by more fit offspring in block 1613, and the entire population is evaluated in block 1614 based on the fitness values developed in block 1612. The best fit member of the population can then be used in 1608 to determine if the stopping criteria is met. If the stopping criteria is met, the GA exits and the best fit member of the population is the channel model transmitted to the CSM in block 1615, which exits the WCGA routine.

Figure 17:
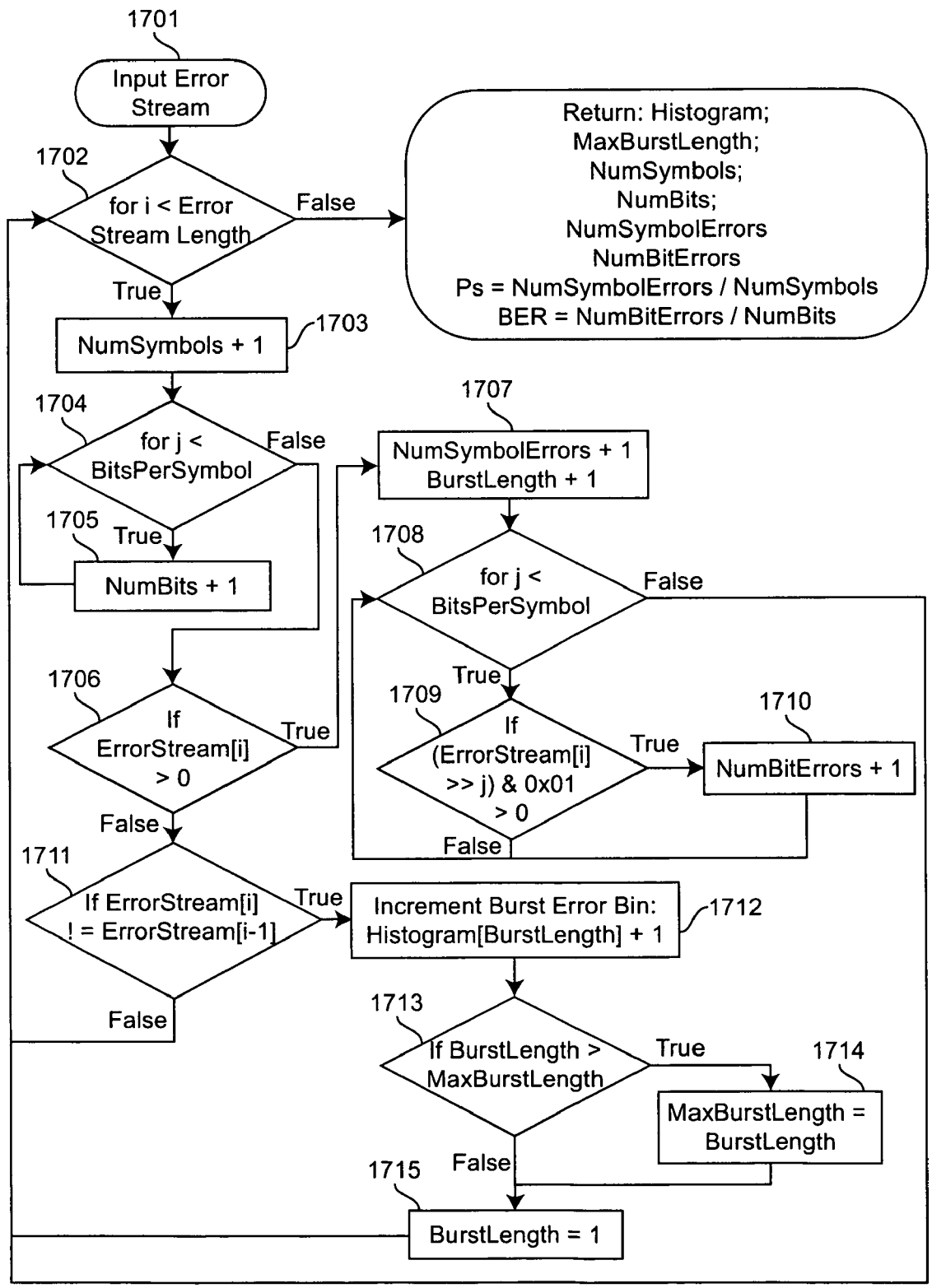
FIG. 17 is a flowchart showing the operation of the "Calculate Statistics" routine in the process of FIG. 7.

FIG. 17 is the flowchart for the calculate channel statistics routine of function block 1605 in FIG. 16. The input 1701 is the error steam from the observed channel and location buffer 1701. A loop 1702 is initiated which cycles from i=0 through the entire length of the error stream. The number of symbols in the stream is counted 1703, and loop 1704 is used to count the number of bits represented in the error stream 1705 by counting from j=0 to the total number of bits per symbol. If the current symbol contains an error as tested by 1706, the number of symbol error and the current burst length are incremented by 1707. The loop initiated in 1708 tests if any bit in each symbol is an error through decision block 1709; all errors are added to the total number of bit errors 1710. If the symbol does not contain any errors as determined in 1706, the current symbol is compared to the previous symbol 1711. If they are different, the burst histogram for the specified burst length is incremented by block 1712. Block 1713 decides if the current burst length is the longest burst length observed; if so, the longest burst length observed, as stored in MaxBurstLength, is updated with the new maximum burst length in block 1714. Block 1715 resets the burst length value to 1 for the next burst. This algorithm is used to develop statistics of the channel including the maximum burst length, the number of symbols and bits, the number of symbol and bit errors, the symbol error rate, the bit error rate, and the histogram of bursts in the channel as stored in block 1716.

FIG. 18 is a flowchart of the initialize population routine, 1801, in function block 1603 in FIG. 16. First, a loop of i=0 to length N, the number of states in the HMM, is run from block 1802. Block 1803 sets a counter to 0, and a second loop in 1804 runs from j=0 to the number of states, N, in order to generate the N×N matrix A of the HMM, 2101. Each index j of row i is set to a random floating point number from 0 to 1 in block 1805 and block 1806 increments the counter by the random value generated in block 1805. Upon completion of this routine, the entire row i in the A matrix has been filled with values. Since this is a probability matrix, all of the elements in each row must sum to 1; therefore, block 1807 divides all elements of row i by the sum of all the elements in that row. The final row vector now sums to 1.

A similar process occurs starting with block 1808, which again sets the counter to 0. Loop 1809 this time runs from j to M, the number of outputs possible at all states (i.e., good symbols and bad symbols for an M of 2). Block 1810 sets the elements of row i of matrix B, 2102, to a randomly generated number from 0 to 1, and, again, the counter is incremented in block 1811. Once loop 1809 finishes, the vector rows of matrix B are then normalized in block 1816 to 1 by dividing all the elements by the sum of all the row elements.

Figure 21:
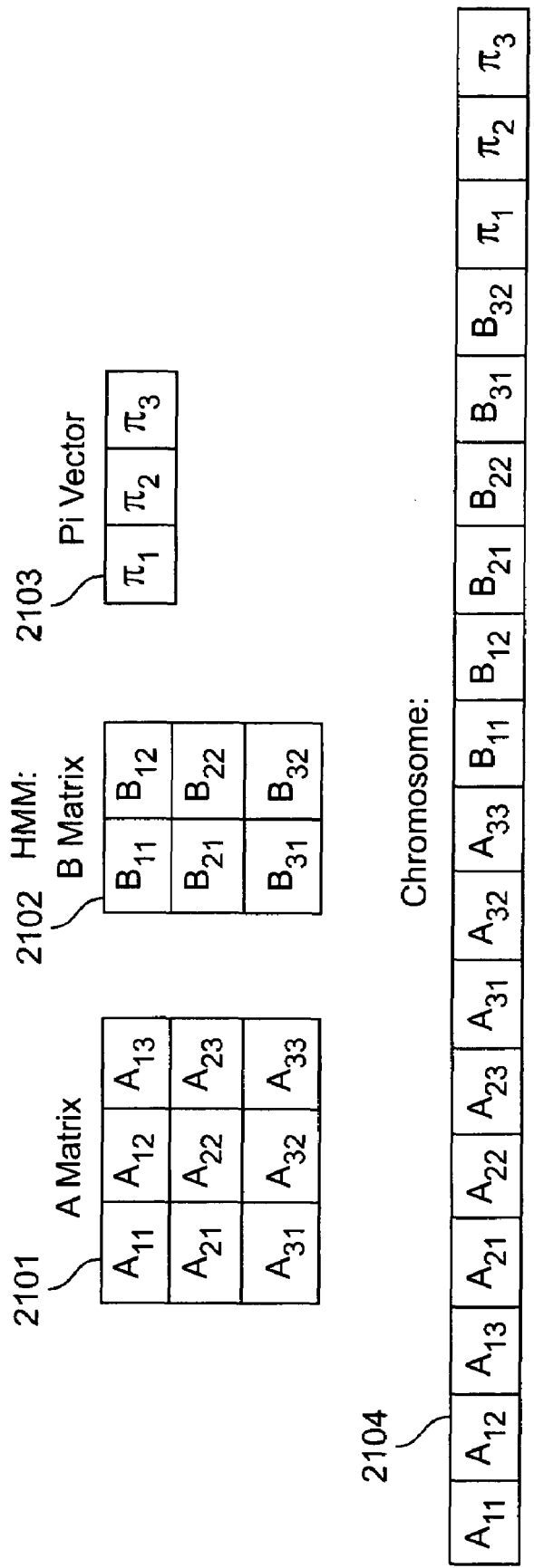
FIG. 21 is a diagram for the example of N=3, M=2 HMM and chromosome for the WCGA.

Loop 1802 ends, and the $\overline{Pi}$ initialization vector of the HMM, 2103, is then initialized. The counter is again set to 0 at block 1812, and loop 1813 cycles for j to N to fill all elements of the N-length $\overline{Pi}$ vector. Each element is set to a random number from 0 to 1 at block 1814, and the counter is incremented in block 1815. After each element has been set, block 1817 normalizes the vector so that the elements sum to 1. Block 1818 simply converts all matrices of the HMM, A, B, and $\overline{Pi}$, into a single vector to represent the chromosome. FIG. 21 shows the HMM in terms of matrices, 2101, 2102, and 2103, and as a chromosome, 2104. Block 1819 evaluates the chromosome's fitness according to the routine of FIG. 19, and finally, block 1820 exits this routine.

Figure 19:
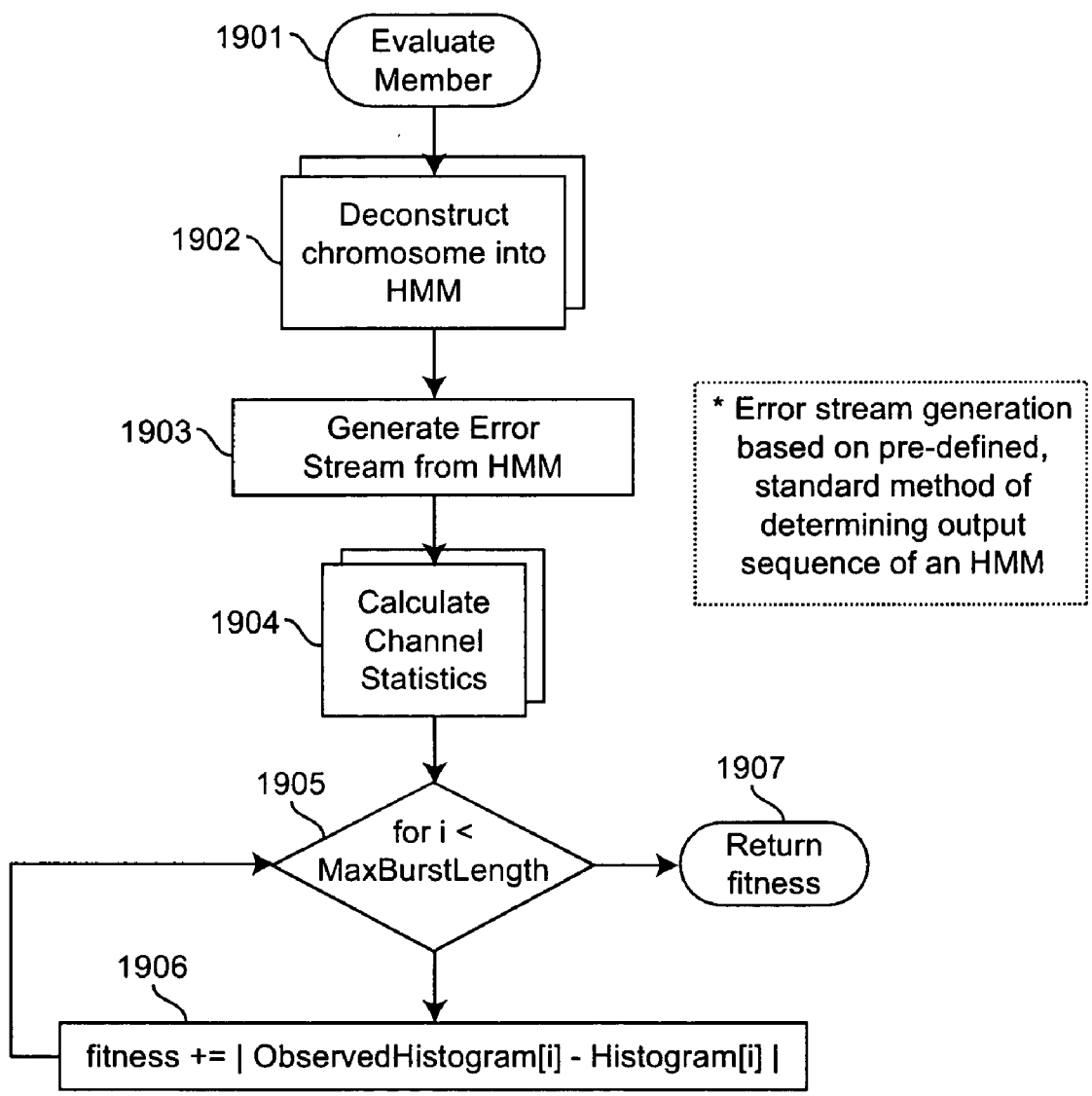
FIG. 19 is a flowchart of the "Evaluate Member" routine in the process of FIG. 17.

FIG. 19 is a flowchart of the evaluate member routine in function block 1608 in FIG. 16. The evaluate routine, 1901, first deconstructs the chromosome back into its HMM form in block 1902 so the HMM can be used to generate the error stream properly in block 1903. The channel statistics are then calculated in block 1904 according to FIG. 18. Loop 1905 loops from i to MaxBurstLength, which was calculated in block 1904 and corresponds to the longest length of successive burst errors for the error stream. For each burst length, the HMM currently being evaluated is compared to an observed vector, which is the actual channel. Fitness in block 1906 is calculated as the sum of the differences between the current channel and the observed channel. When loop 1905 ends, the fitness is returned at block 1907, where a smaller fitness is desired.

Figure 20:
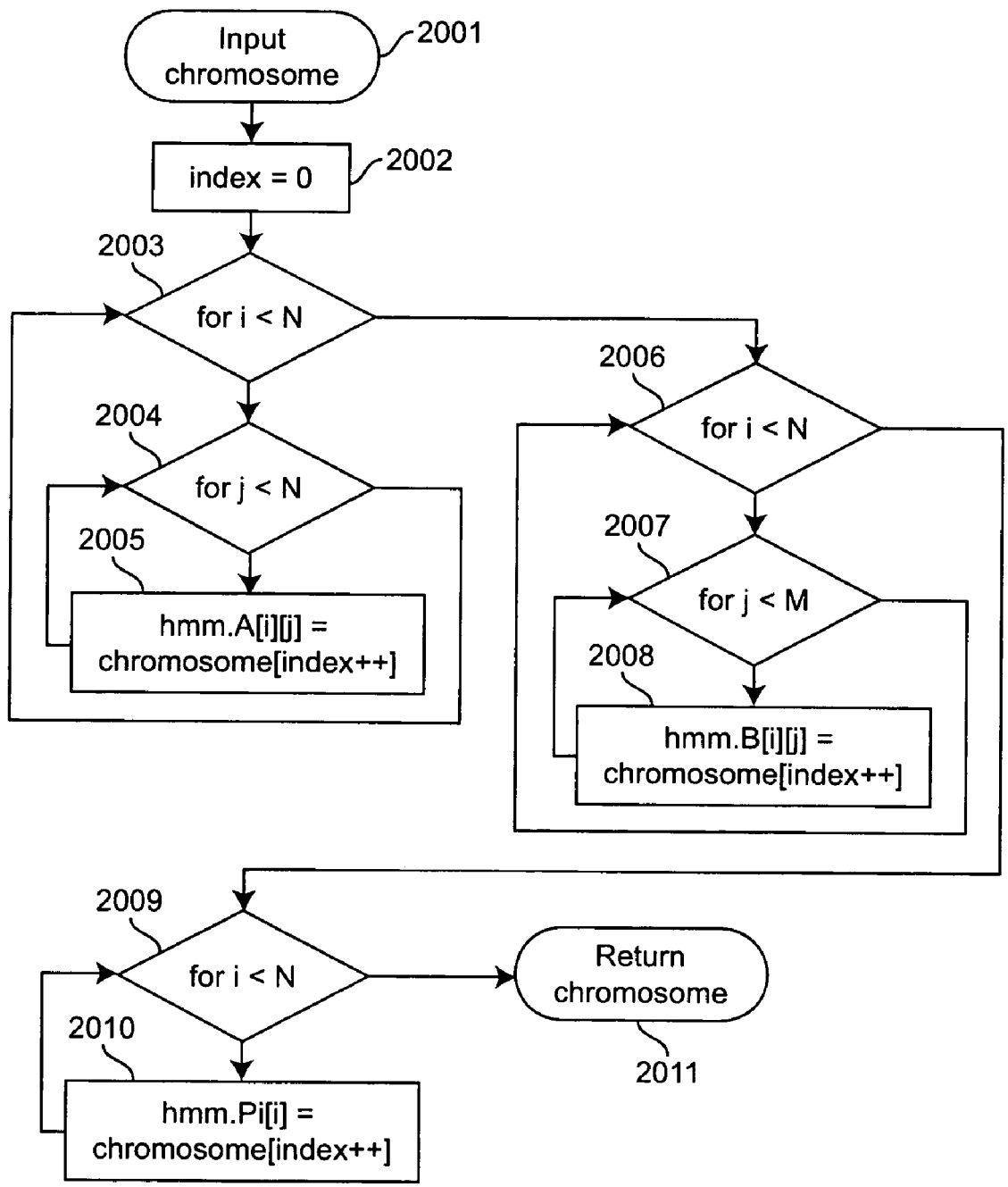
FIG. 20 is a flowchart of the "Deconstruct Chromosome" routine in the process of FIG. 17.

FIG. 20 is a flowchart of the deconstruct chromosome routine of 1902. The routine takes in a chromosome at block 2001 and sets an index value to 0 in block 2002. Loop 2003 cycles through the A matrix of the HMM, 2101, going from i=0 to N, the number of HMM states, where an internal loop, 2004, cycles from j=0 to N. Each element in matrix A, A[i][j], is placed into the chromosome vector at position index, which is then incremented, in block 2005. When loop 2003 exits, the routine enters loop 2006, which cycles through the B matrix, 2102. Loop 2006 cycles from i=0 to N, and the internal loop, 2007, cycles through j=0 to M, the number of output symbols for the HMM. Each element of matrix B, B[i][j], is then sequentially placed after the A matrix into the chromosome at position index, which is then incremented, in block 2008. Loop 2006 exits, and the remaining conversion is to put the $\overline{Pi}$ vector, 2103 into the chromosome. Since $\overline{Pi}$ is a vector, it only requires a single loop, 2009, from i=0 to N, when each element, $\overline{Pi}[i]$, is placed into the chromosome after the B matrix at position index, which is again incremented, in block 2010. After the A, B, and $\overline{Pi}$ matrices are properly placed into the chromosome, the routine exits at block 2011, which returns the chromosome.

Several chromosome structures were devices that allow the representation of wireless channels. An example of an HMM and the equivalent WCGA chromosome is shown in FIG. 21. Matrix A, 2101, is the N×N state transition matrix of the HMM. Give a current state, there is a certain probability of moving to any other of the states or of staying in the same state. The columns set the current state and the row sets the state being transitioned to. For example, element A21 is the probability of going from state 1 to state 2.

Matrix B, 2102, is the N×M state output matrix of the HMM. At any given state, represented by the row, there is a probability of outputting a certain output symbol, represented by the column. The output values can represent a good or bad bit, or a good or bad symbol (where a symbol can represent many bits). For example, an output of zero represents a good symbol and an output of one represents a bad symbol, so given that the HMM is in state 1 at a given time, there is a probability of B11 of outputting a 0, or good symbol, and a probability of B12 of outputting a 1, or bad symbol.

The chromosome representation in 2104 shows how the HMM is converted into a chromosome for manipulation by the genetic algorithm. Each row and matrix is lined up back to back to create a single vector that can then be used in genetic operations such as crossover and mutation.

Figure 22:
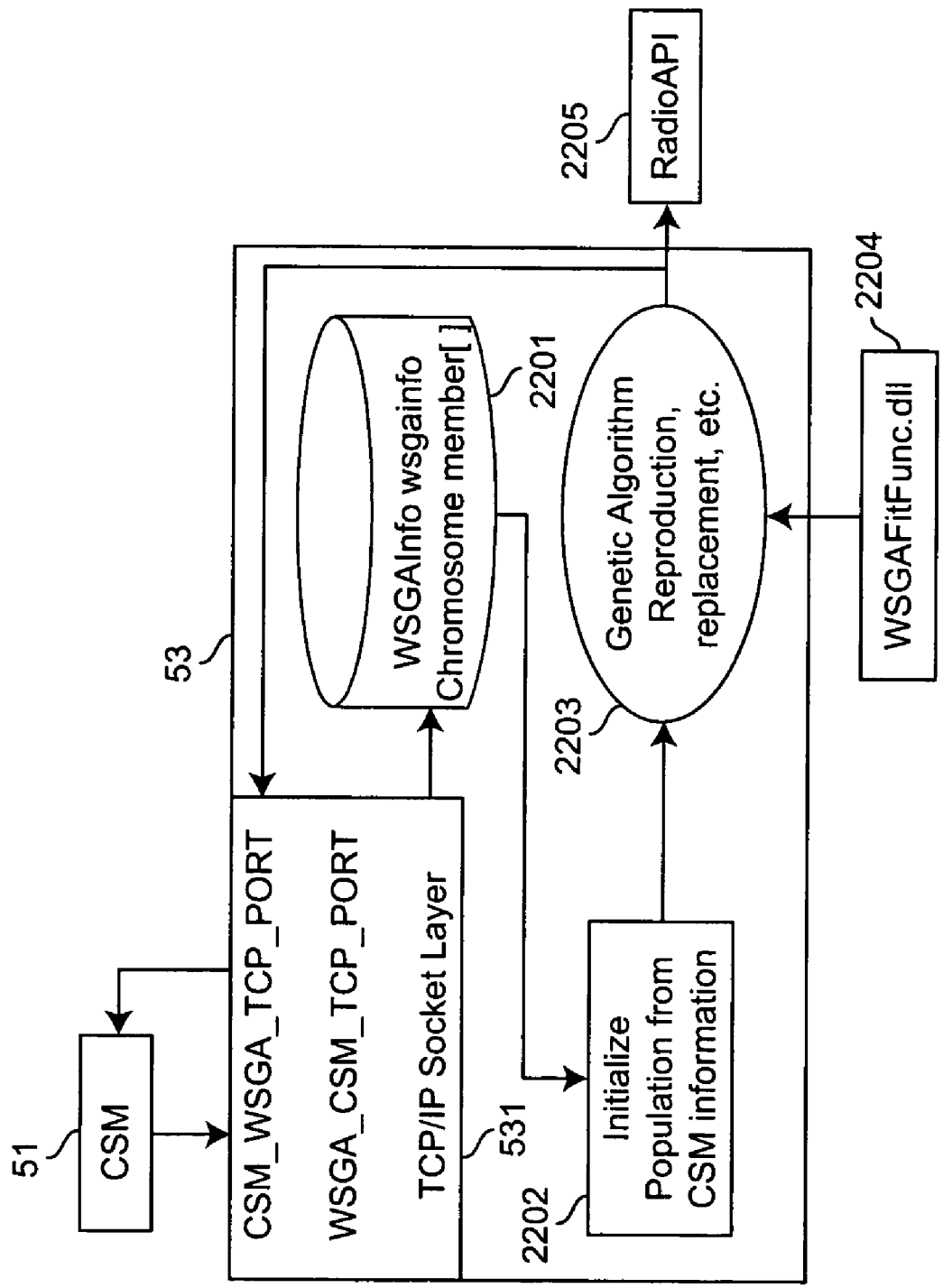
FIG. 22 is a block diagram of the WSGA according to the invention.
Figure 23:
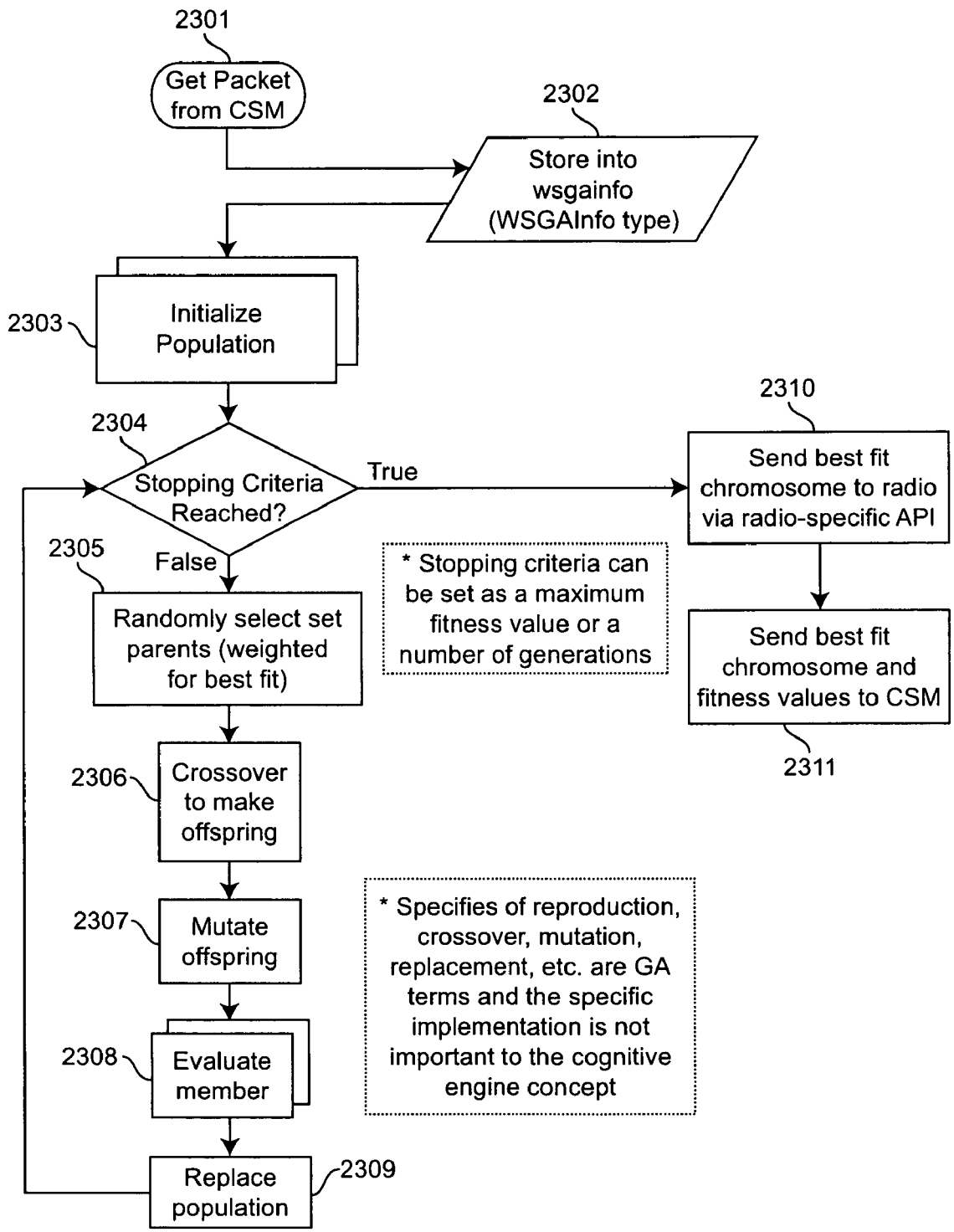
FIG. 23 is a flowchart of the operation of the WSGA according to the invention.
Figure 24:
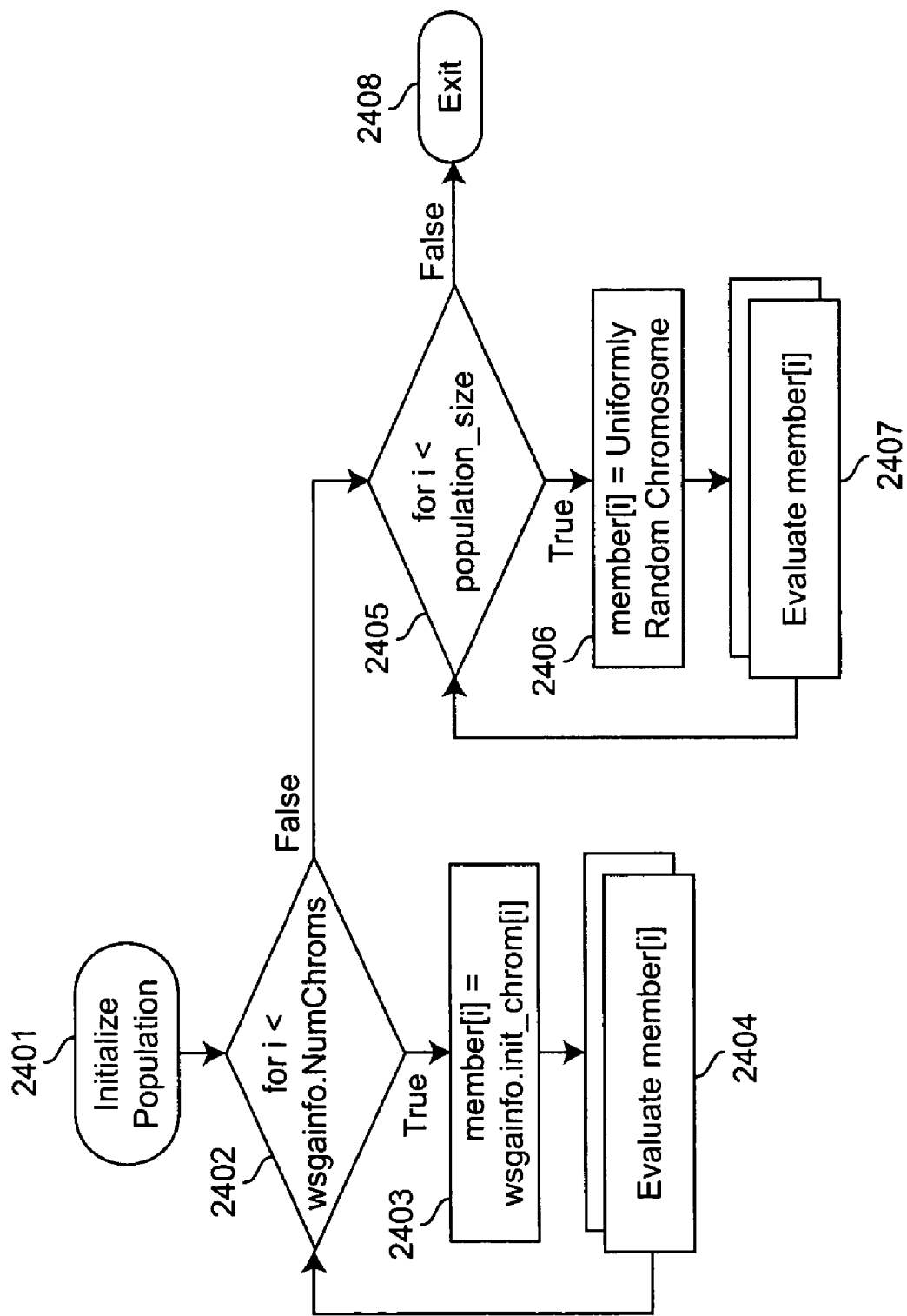
FIG. 24 is a flowchart of the "Initialize Population" routine in the process of FIG. 23.

FIG. 22 is a detailed block diagram of the WSGA 53. It receives input from the CSM 51 via the TCP/IP socket layer 531. Information about the WSGA is stored in a structure called WSGAInfo, and the member chromosomes of the genetic algorithm are stored in 2201. Block 2202 initializes the member chromosomes as shown in FIG. 24. Block 2203 is the genetic algorithm used to determine the new radio system parameters as shown in FIG. 23, which links to a dynamic link library (DLL) to retrieve the mathematical fitness functions in block 2204. The final solution from the genetic algorithm is transmitted to the radio via a radio-specific Application Programmable Interface (API) of block 2205.

The WSGA chromosome structure is shown in the following table.

| Chromosome Parameters | |
|---|---|
| 0 | Power |
| 1 | fc |
| 2 | Bandwidth |
| 3 | Symbol Rate |
| 4 | Modulation |
| 5 | FEC |
| 6 | Payload/frame length |
| 7 | ARQ |
| 8 | Dynamic Range |
| 9 | Equalization |
| 10 | Encryption |
| 11 | Antenna Configuration |
| 12 | Voice |
| 13 | Noise Cancellation (limiting) |
| 14 | Interference Temperature |
| 15 | TDD |
| 16 | Proprietary 1 |
| . | . |
| . | . |
| . | . |
| 31 | Proprietary |

This table is viewed as a vector in the algorithm and operated upon as a chromosome through genetic algorithm crossover and mutation procedures. The values of these table parameters determine the fitness of the chromosome and the behavior of the radio.

FIG. 23 is a flowchart showing the operation of the WSGA. The input 2301 is a packet from the CSM 51 which is temporarily stored at 2302. The population of chromosomes is initialized in 2303 according to the routine of FIG. 24. Decision block 2304 controls the genetic algorithm loop and exits the loop upon a stopping criteria, which could be a certain number of generations or after a decrease in performance gain per generation is detected (that is, the fitness of the current generation did not differ significantly from the previous generation). While the loop is running, block 2305 selects parent chromosomes that will be used to generate offspring chromosomes to replace the population the next generation. Blocks 2306 and 2307 perform standard genetic algorithm techniques of crossover and mutation, respectively. Block 2308 evaluates the fitness values for each chromosome, both parent and offspring. Block 2309 determines which members of the population to replace using a relative fitness evaluation method of FIG. 26. Once the genetic algorithm loop has exited, block 2310 transmits the system parameters as defined in the best fit chromosome of the final generation to the radio via an API. Block 2311 also transmits the best fit chromosome along with the simulated fitness values to the CSM so the CSM can compare the simulated fitness values to the real fitness values read from the radio after the new radio settings have been set.

FIG. 24 is the flowchart of the initialize population routine of function block 2303 in FIG. 23. This routine first fills the initial population of the WSGA with children received from the CSM and then randomly generates any more children required to fill the population. Block 2401 initializes the routine. Loop 2402 cycles through all child chromosomes received from the CSM, where block 2403 inputs the child into the population and block 2404 evaluates the chromosomes fitness values. Loop 2405 then cycles through the remaining populated indices where block 2406 randomly generates chromosomes to fill the population and block 2407 evaluates the fitness of the new chromosomes. Once the population is filled, the routine exits 2408.

Figure 25:
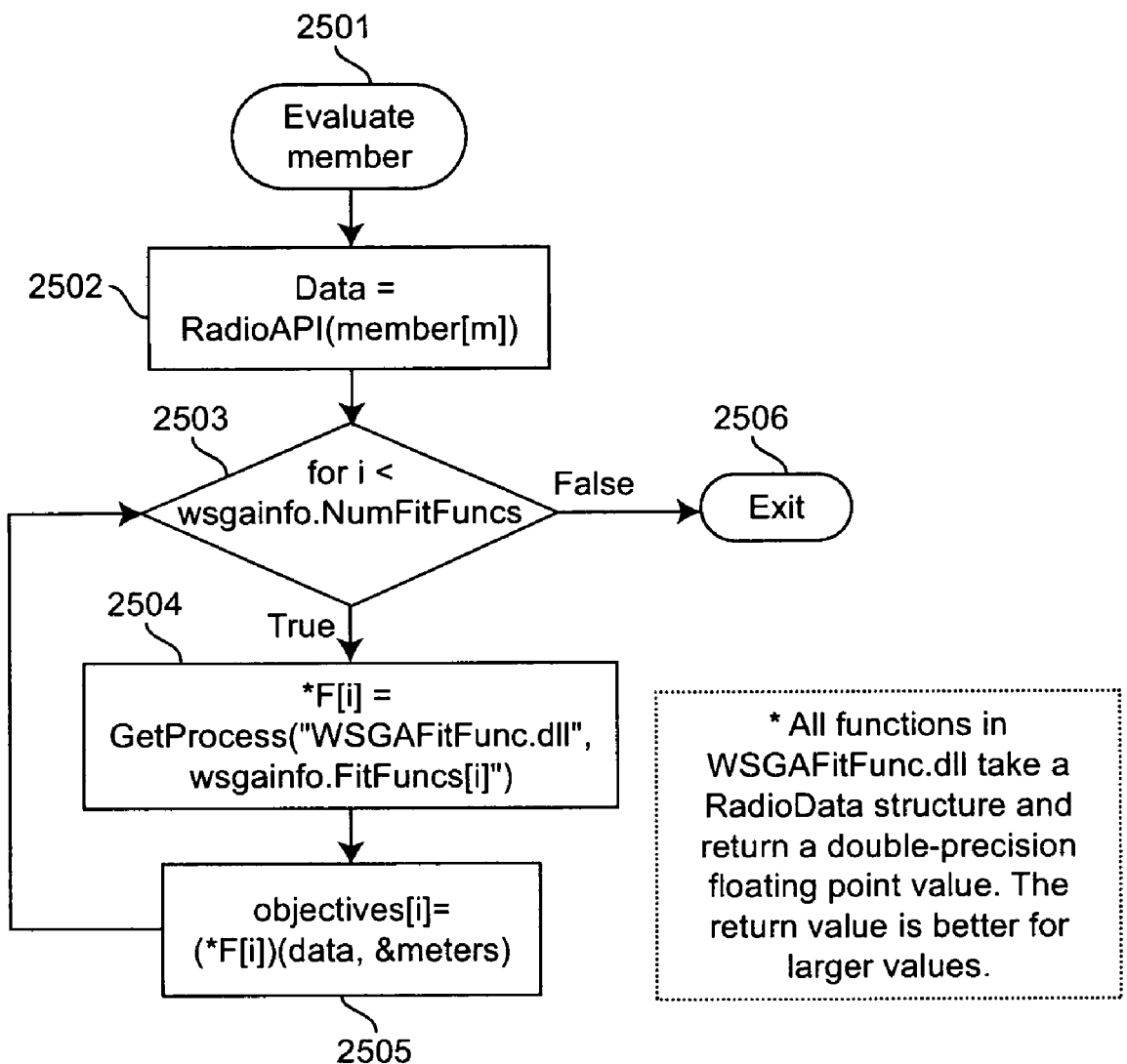
FIG. 25 is a flowchart of the "Evaluate Member" routine in the process of FIG. 23.

FIG. 25 is a flowchart of the evaluate member routine of function block 2308. Starting at block 2501, the chromosome is translated to absolute radio parameters (power in terms of dBm, frequency in Hz, etc.) stored in structure data through the radio-specific API at block 2502. Loop 2503 cycles through all of the current fitness functions used to evaluate the members using an index variable i. During the loop, each fitness function is evaluated by calling the function out of the "WSGAFitFunc.dll" dynamic link library (DLL) in block 2504. The DLL is useful for dynamic linking because the radio system may be updated in real-time with new or improved fitness evaluation functions without altering the rest of the system. Block 2505 uses the function from the DLL to calculate the fitness for each fitness function, called an objective by passing the data structure to the function as well as a meters structure, which is updated inside the DLL function to contain simulated meters of the radio's performance. When loop 2503 has finished evaluating all of the fitness functions, the routine exits 2506.

Figure 26:
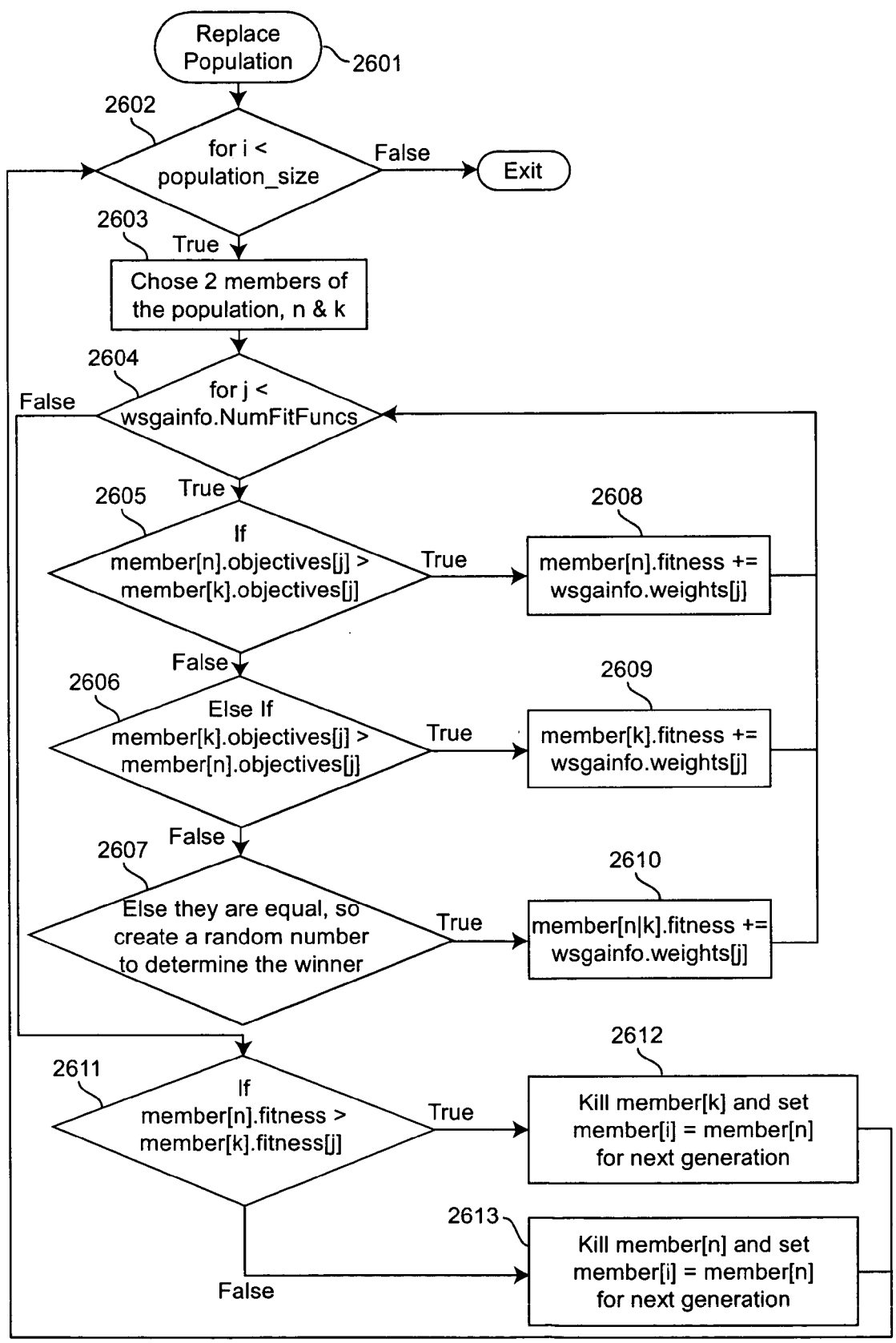
FIG. 26 is a flowchart of the "Replace Population" routine in the process of FIG. 23.

FIG. 26 is a flowchart of the replace population member routine 2601 based on a relative tournament selection scheme. Loop 2602 cycles through by incrementing index i from 0 to the total population size. Each cycle, 2 members, designated as member[n] and member[k], are chosen from the population of parents and offspring at block 2603. Loop 2604 then uses index j to cycle through all of the fitness functions. Decision blocks 2605, 2606 and 2607 decide which of the two members won by comparing the fitness values associated with each objective. If the objective of member[n] is greater than the objective of member[k] in block 2605, then member[n] wins and block 2608 increments the fitness value by adding the amount of weight associated with the current fitness function being compared to the member's fitness. Else, if the objective of member[k] is larger than the objective of member[n] in block 2606, than member[k] wins and block 2609 increments member[k]'s fitness value according the amount of weight on the function. If the two members' objectives are equal, a uniformly random number is generated between 0 and 1, and if it is less than 0.5, member[n] wins the tournament; otherwise, member[k] wins and block 2610 updates the fitness value of the winning member.

After all objectives have been compared and the fitness values properly incremented and loop 2604 has ended, members [n] and [k]'s fitness is compared in block 2611, and if member[n]'s fitness is larger than member[k]'s fitness, then member[k] is removed from the population and member[n] survives in the population to be a part of the next generation in block 2612; otherwise, member[n] is killed and member[k] survives to the next generation in block 2613. After the entire population of parents and offspring have been compared and the next population chosen, the routine exits 2614. This relative tournament selection mechanism is a way to compare population members and choose the best fit members for survival to the next generation when there are multiple objectives to consider. The weights allow the system to adjust its priorities when it thinks one fitness function is more important than another (e.g., minimizing the bit error rate may be more important than maximizing the data rate, so the weights can help determine how much each matters).

The CSM evolutionary algorithm consists of a learning classifier function that classifies the observed channel model received from the WCGA or broadband channel sounder and a meta-genetic algorithm that determines the appropriate fitness function, chromosome structure, and templates using the crossover operator based on knowledge from its short and long term memories as well as the creative new solutions generated from its mutation functions.

The genetic algorithm (GA) approach to adapting a wireless radio according to the present invention provides many benefits. First, it is a chaotic search with controllable boundaries that allow it to seek out and discover unique solutions efficiently. In unknown channels, chaotic behavior could produce a solution that is absolutely correct but may be counter-intuitive. By being able to control the search space by limiting the number of generations, crossover rates, mutation rates, fitness evaluations, etc., the cognitive system can ensure legal and regulatory compliance as well as efficient searches.

Another major benefit of the GA approach is the versatility of the cognitive process to any radio. While a software radio is an ideal host system for a cognitive processor, any legacy radio with the smallest amount of adaptability can benefit from our cognitive processes. The cognitive system defines the radio chromosome, where each gene represents a radio parameter such as transmit power, frequency, modulation, etc. The adaptation process of the WSGA is performed on the chromosomes to develop new values for each gene, which is then used to adapt the radio settings. If a radio cannot adjust a particular parameter, then the adaptation process will ignore the gene representing the parameter. Also, if there are certain parameters unique to a particular adaptable radio, a few genes can be left unused so as to be used for such proprietary purposes. See, again the Chromosome Parameters table above.

Because each radio will have a unique method of adapting the radio parameters and each parameter will mean something different, a small hardware interface is required to connect the WSGA to the radio. The hardware interface will take the chromosome from the WSGA and use the gene values to properly update the radio. The hardware interface is a small piece of software required for each radio while the cognitive processing engine remains system-independent. While the independence of the WSGA and the cognitive processor to the radio allows any adaptable radio to become a cognitive radio, it should be clear that the more adaptable a radio is, the more powerful the cognition becomes.

Each of the three main algorithms (CSM, WSGA and WCGA) can be co-located or distributed. "Co-located" means that the three algorithms exist in the same radio with shared memory and processing. "Distributed" means that one or more of the algorithms exists on another radio with separate memory and processing. The knowledge base developed in long term memory may also be distributed, allowing for physically distributed cognitive consciousness that appear logically the same to the CSM.

For example, a base station unit (BSU) may have both the WCGA and CSM in its system to model the radio environment and maintain the long term memory that the subscriber units can access for their independent WSGA algorithms running locally. This scenario allows for a common memory bank and associated realization of the radio environment, but each system can adapt independently. If a radio adapts to a set of parameters that are more successful in the radio environment, it can then communicate its successful adaptation back to the BSU for better future adaptation by all radios. Another scenario could be that the radio has its own sensing mechanism, but sends the channel model to another radio for CSM and WSGA processing. The output of the WSGA could then be sent back to the original radio for adaptation. In both examples, the long term memory could be mapped to a local device or set of devices. This distributed knowledge base concept allows the power of the GA approach to be realized, because as the network becomes more complex, the knowledge base has a mechanism to scale with it.

Figure 27:
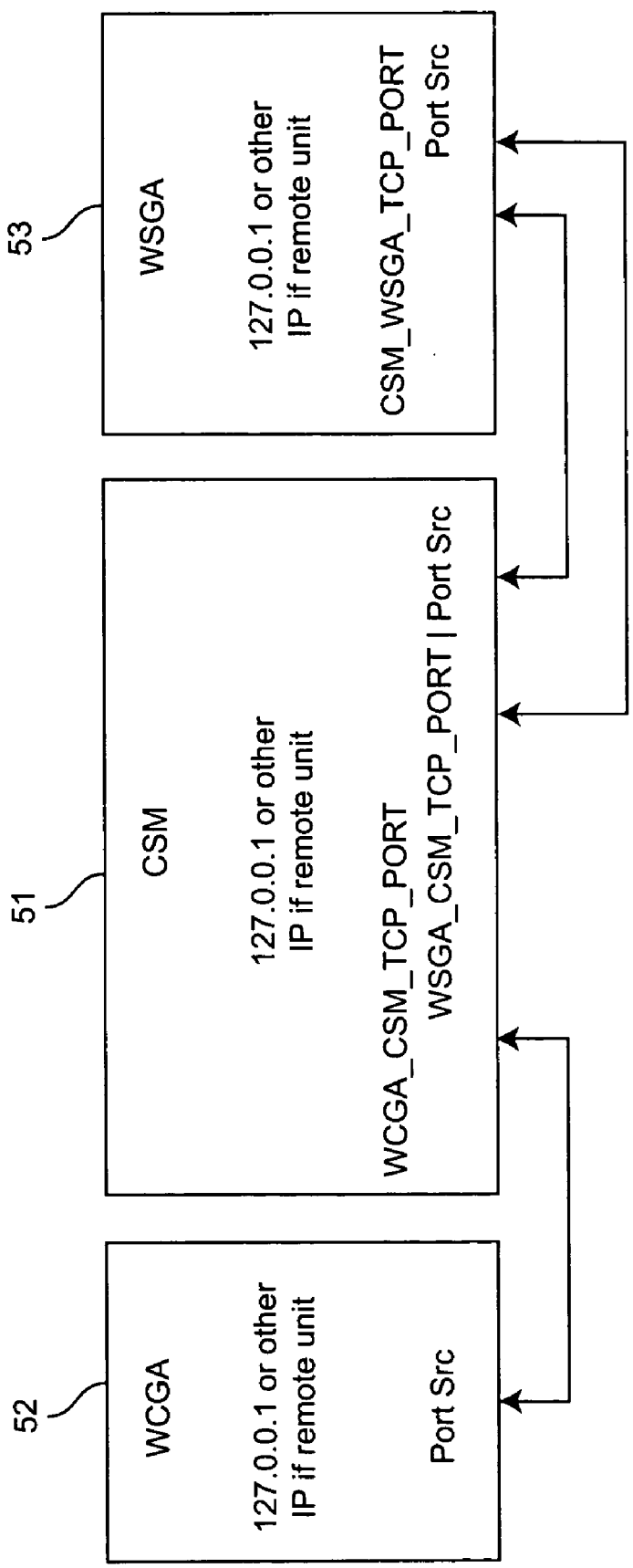
FIG. 27 is a block diagram of a distributed cognitive engine according to the invention.

The method of exchanging data between the algorithms must allow for both co-located and distributed systems. We therefore chose to use a socket-driven TCP/IP protocol stack as illustrated in FIG. 27, with the WCGA 52, CSM 51 and WSGA 53 algorithms connected as shown. The interface between the systems is all packet based and is sent using TCP to a specific socket in the system. The basic TCP datagram is illustrated in FIG. 28. The socket-based communications is convenient because it has a common port to connect to but is also related to the IP address of the radio system. For co-located algorithms, the IP address can be simply set to the system's ow!n IP address or the internal loopback address (usually defined as 127.0.0.1). To communicate the information between distributed systems, a change in the IP address is all that is required.

Figure 29:
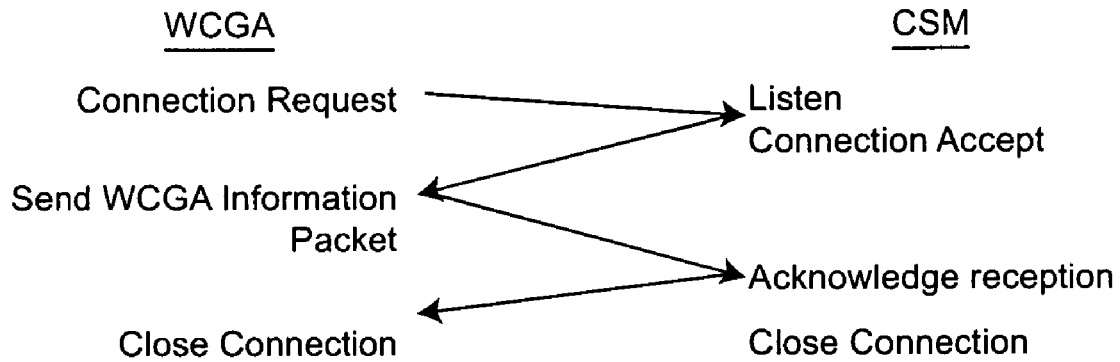
FIG. 29 is a data flow diagram showing the event sequence for transmission of a packet from the WCGA to the CSM.

When the WCGA has a channel model for the CSM, it opens a TCP socket connected to port WCGA_CSM_TCP_PORT. A packet of information is then sent from the WCGA to the CSM and the connection closed. The sequence of events for passing the data between the WCGA and the CSM is shown in FIG. 29. The WCGA-CSM packet for passing channel statistics and a burst error histogram is shown in FIG. 30.

Figure 31:
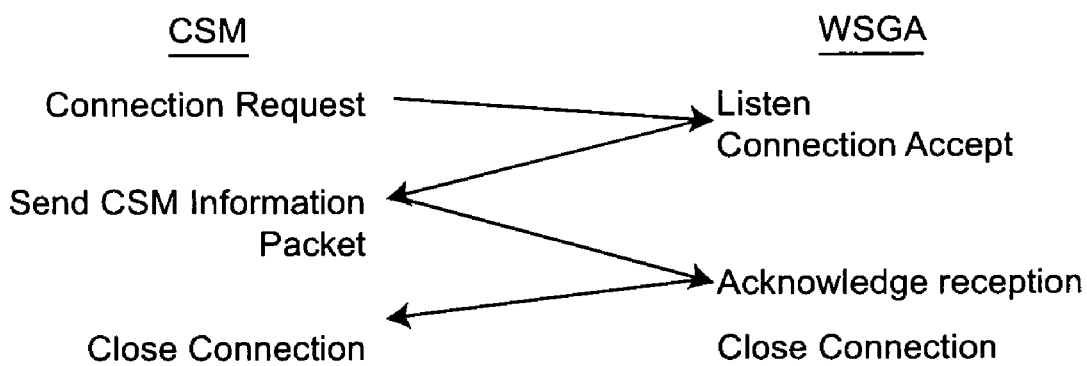
FIG. 31 is a data flow diagram showing the event sequence for transmission of a packet from the CSM to the WSGA.

The CSM to WSGA communications is very similar to the WCGA to CSM communications; however, now the CSM opens the communications when the packet is ready. The CSM opens a TCP socket in the WSGA on part WSGA_TCP_PORT. The packet is sent, and the connection is closed. The sequence of events for passing the data between the CSM and the WSGA is shown in FIG. 31. The CSM-WSGA packet for passing the WSGA control information is shown in FIG. 32.

Figure 33:
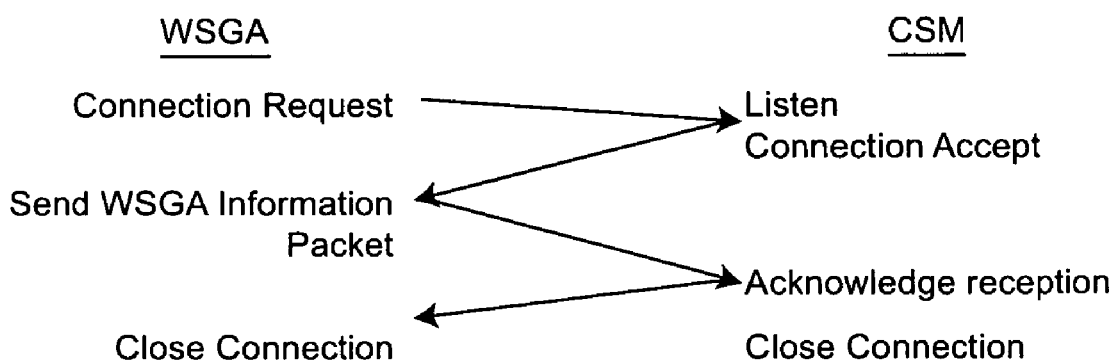
FIG. 33 is a data flow diagram showing the event sequence for the transmission of a packet from the WSGA to the CSM.

The WSGA then passes information back to the CSM regarding the new system chromosome developed. Again, the communications are very similar to the previous method, only the WSGA opens a TCP socket on the CSM on port WSGA_CSM_TCP_Port. The packet is sent, and the connection is closed. The sequence of events for passing the data between the WSGA and the CSM is shown in FIG. 33. The WSGA-CSM packet for passing the WSGA final information is shown in FIG. 34.

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A cognitive radio engine for controlling an adaptive radio, wherein the cognitive radio engine defines a radio chromosome, where each gene represents a radio parameter, said cognitive engine comprising:

a wireless channel genetic algorithm (WCGA) receiving channel information from the adaptive radio and modeling the channel;

a cognitive system monitor (CSM) receiving the modeled channel from the WCGA and determining if a new radio configuration is needed, building trends from the WCGA and radio statistics, and developing a set of fitness functions; and a wireless system genetic algorithm (WSGA) receiving the set of fitness functions from the CSM and developing a system chromosome and creating a fitness to match the fitness goal function, said WSGA passing a new system configuration to the adaptive radio which, in turn, reconfigures itself according to the new system configuration, said cognitive radio engine implementing a chaotic search with controllable boundaries to seek out and discover unique solutions.

2. The cognitive radio engine recited in claim 1, wherein the chaotic search is controlled by the cognitive radio engine by limiting the range of achievable gene values in the system chromosome to ensure legal and regulatory compliance.

3. The cognitive radio engine recited in claim 1, wherein the WSGA performs an adaptation process on the chromosomes to develop new values for each gene, which values are then used to modify the radio settings.

4. A cognitive radio system comprising:

an adaptive radio receiving data and radio frequency (RF) signals on a channel, generating channel performance information and responsive to configuration information to reconfigure baseband radio parameters according to the configuration information; and a cognitive radio engine for controlling an adaptive radio, wherein the cognitive radio engine defines a radio chromosome, where each gene represents a radio parameter, said cognitive engine comprising:

a wireless channel genetic algorithm (WCGA) receiving channel information from the adaptive radio and modeling the channel;

a cognitive system monitor (CSM) receiving the modeled channel from the WCGA and determining if a new radio configuration is needed, building trends from the WCGA and radio statistics, and developing a set of fitness functions; and a wireless system genetic algorithm (WSGA) receiving the set of fitness functions from the CSM and developing a system chromosome and creating a fitness to match the fitness goal function, said WSGA passing a new system configuration information to the adaptive radio which, in turn, reconfigures itself according to the new system configuration, said cognitive radio engine implementing a chaotic search with controllable boundaries to seek out and discover unique solutions.

5. The cognitive radio system recited in claim 4, wherein the chaotic search is controlled by the cognitive radio engine by limiting the range of achievable gene values in the system chromosome to ensure legal and regulatory compliance.

6. The cognitive radio engine recited in claim 4, wherein the WSGA performs an adaptation process on the chromosomes to develop new values for each gene, which is then used to adapt the radio settings.

7. A radio network comprising:

a first adaptive radio transmitting and receiving data and radio frequency (RF) signals on a cognitive radio channel, generating channel performance information and responsive to configuration information to reconfigure baseband radio parameters according to the configuration information;

a second adaptive radio transmitting and receiving data and radio frequency (RF) signals on said cognitive radio channel, generating channel performance information and responsive to configuration information to reconfigure baseband radio parameters according to the configuration information, said cognitive radio channel establishing a cognitive radio link between said first and second adaptive radios; and first and second cognitive radio engines connected to and controlling said first and second adaptive radios, respectively, wherein the first and second cognitive radio engines define a radio chromosome, where each gene represents a radio parameter, each said cognitive radio engine comprising:

a wireless channel genetic algorithm (WCGA) receiving channel information from the adaptive radio and modeling the channel;

a cognitive system monitor (CSM) receiving the modeled channel from the WCGA and determining if a new radio configuration is needed, building trends from the WCGA and radio statistics, and developing a set of fitness functions; and a wireless system genetic algorithm (WSGA) receiving the set of fitness functions from the CSM and developing a system chromosome and creating a fitness to match the fitness goal function, said WSGA passing a new system configuration information to the adaptive radio which, in turn, reconfigures itself according to the new system configuration, said cognitive radio engine implementing a chaotic search with controllable boundaries to seek out and discover unique solutions.

8. The radio network recited in claim 7, wherein the chaotic search is controlled by each of the cognitive radio engines by limiting the range of achievable gene values in the system chromosome to ensure legal and regulatory compliance.

9. The radio network recited in claim 7, wherein the WSGA performs an adaptation process on the chromosomes to develop new values for each gene, which values are then used to modify the radio settings.

10. The radio network recited in claim 7, wherein the WCGA, the CSM and the WSGA are co-located at each of the cognitive radio engines.

11. The radio network recited in claim 7, wherein one or more of the WCGA, the CSM and the WSGA are distributed among two or more cognitive radio engines.

12. The radio network recited in claim 11, wherein a socket-driven TCP/IP (Transfer Control Protocol/Internet Protocol) stack is used to communicate information between distributed algorithms.

13. The radio network recited in claim 7, further comprising:
   a first plurality of broadband users;
   a first router to which the first plurality of broadband users are connected, said first router being connected to said first adaptive radio;
   a second plurality of broadband users; and
   a second router to which the first plurality of broadband users are connected, said second router being connected to said second adaptive radio.

14. The radio network recited in claim 13, wherein at least one of said first and second routers is connected to the Internet, providing Internet access to said first and second plurality of broadband users.

15. A method for controlling an adaptive radio which defines a radio chromosome, where each gene represents a radio parameter, comprising the steps of:
   receiving by a wireless channel genetic algorithm (WCGA) channel information from the adaptive radio and modeling the channel;
   receiving by a cognitive system monitor (CSM) the modeled channel from the WCGA and determining if a new radio configuration is needed, building trends from the WCGA and radio statistics, implementing a chaotic search with controllable boundaries to seek out and discover unique solutions, and developing a set of fitness functions; and
   receiving by a wireless system genetic algorithm (WSGA) the set of fitness functions from the CSM and developing a system chromosome and creating a fitness to match the fitness goal function, said WSGA passing a new system configuration to the adaptive radio which, in turn, reconfigures itself according to the new system configuration.

16. The method for controlling an adaptive radio recited in claim 15, wherein the chaotic search is controlled by limiting the range of achievable gene values in the system chromosome to ensure legal and regulatory compliance.

17. The method for controlling an adaptive radio recited in claim 15, wherein the WSGA performs an adaptation process on the chromosomes to develop new values for each gene, which values are then used to modify the radio settings.

* * * * *